US012756505B2

(12) United States Patent
Yoshioka et al.

(10) Patent No.: US 12,756,505 B2
(45) Date of Patent: Oct. 6, 2026

(54) TERMINAL AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 309 days.

(21) Appl. No.: 18/564,426

(22) PCT Filed: Jun. 11, 2021

(86) PCT No.: PCT/JP2021/022415
§ 371 (c)(1),
(2) Date: Nov. 27, 2023

(87) PCT Pub. No.: WO2022/259556
PCT Pub. Date: Dec. 15, 2022

(65) Prior Publication Data
US 2024/0250782 A1 Jul. 25, 2024

(51) Int. Cl.
*H04L 1/1829* (2023.01)
*H04L 1/1867* (2023.01)

(52) U.S. Cl.
CPC .......... *H04L 1/1854* (2013.01); *H04L 1/1887* (2013.01)

(58) Field of Classification Search
CPC ... H04L 1/1854; H04L 1/1887; H04L 1/1864; H04L 1/1896; H04L 1/1861; H04W 28/04; H04W 72/04
See application file for complete search history.

(56) References Cited

U.S. PATENT DOCUMENTS

2016/0234830 A1* 8/2016 Kim ...................... H04L 1/1861
2021/0092762 A1* 3/2021 Choi ...................... H04L 1/1854
2022/0201724 A1* 6/2022 Zhang ...................... H04L 1/1861
2024/0097830 A1* 3/2024 Hooli ...................... H04L 1/1854
2024/0172229 A1* 5/2024 Gao ...................... H04L 1/1861

OTHER PUBLICATIONS

Office Action issued in Japanese Patent Application No. 2023-526834, dated Jan. 21, 2025 (5 pages).

(Continued)

*Primary Examiner* — Chirag G Shah
*Assistant Examiner* — Joshua Smith
(74) *Attorney, Agent, or Firm* — Osha Bergman Watanabe & Burton LLP

(57) ABSTRACT

A terminal includes: a reception unit configured to receive a grant related to an uplink shared channel from a base station; a control unit configured to determine whether HARQ-ACK (Hybrid automatic repeat request—Acknowledgement) is to be multiplexed with the uplink shared channel in a case where a DAI (Downlink Assignment Index) included in the grant indicates that the HARQ-ACK is to be multiplexed with the uplink shared channel and where a downlink allocation corresponding to the HARQ-ACK that is to be multiplexed with the uplink shared channel is not received; and a transmission unit configured to transmit the uplink shared channel to the base station.

4 Claims, 15 Drawing Sheets

(56) References Cited

OTHER PUBLICATIONS

3GPP TS 38.300 V16.5.0; "3rd Generation Partnership Project; Technical Specification Group Radio Access Network; NR; NR and NG-RAN Overall Description; Stage 2 (Release 16)"; Mar. 2021 (151 pages).
3GPP TS 38.213 V16.5.0; "3rd Generation Partnership Project; Technical Specification Group Radio Access Network; NR; Physical layer procedures for control (Release 16)"; Mar. 2021 (183 pages).
International Search Report issued in corresponding International Application No. PCT/JP2021/022415, mailed on Jan. 18, 2022 (3 pages).
Written Opinion issued in corresponding International Application No. PCT/JP2021/022415, mailed on Jan. 18, 2022 (3 pages).
Apple; "Summary for [105-e-NR-7.1CRs-02] Discussions on PUSCH UCI Multiplexing without HARQ-ACK PUCCH"; 3GPP TSG RAN WG1 Meeting #105-e, R1-2106317; e-Meeting; May 10-27, 2021 (23 pages).
Office Action issued in Japanese Application No. 2023-526834; Dated Jun. 3, 2025 (6 pages).

* cited by examiner

TERMINAL AND COMMUNICATION METHOD

FIELD OF THE INVENTION

The present invention relates to a terminal and a communication method in a wireless communication system.

BACKGROUND OF THE INVENTION

In 3GPP (3rd Generation Partnership Project), in order to realize further larger system capacity, further faster data transmission speed, further lower latency in a wireless communication section, etc., a wireless communication method called "5G" or "NR (New Radio)" has been discussed (hereinafter, the wireless communication method is referred to as "NR"). In 5G, various wireless technologies and network architectures are being discussed to satisfy the requirement of a radio link delay of 1 ms or less while achieving throughput of 10 Gbps or more (e.g., non-patent literature 1).

In addition, in NR, in a case where PUCCH (Physical Uplink Control Channel) including HARQ-ACK (Hybrid automatic repeat request—Acknowledgement) overlaps with one or more PUSCHs (Physical Uplink Shared Channels) at least in a time domain, the HARQ-ACK is multiplexed with one of the PUSCHs.

CITATION LIST

Non-Patent Document

Non-Patent Document 1: 3GPP TS 38.300 V16.5.0 (2021 March)

Non-Patent Document 2: 3GPP TS 38.213 V16.5.0 (2021 March)

SUMMARY OF THE INVENTION

Technical Problem

The number of HARQ-ACK bits to be multiplexed with PUSCH is determined based on the DAI (Downlink Assignment Index) included in a UL grant that is DCI (Downlink Control Information) that schedules PUSCH. For example, an operation of a terminal has not been specified for a case in which the DAI included in the UL grant indicates multiplexing of the HARQ-ACK and where PDCCH (Physical Downlink Control Channel) that schedules PDSCH (Physical Downlink Shared Channel) corresponding to the HARQ-ACK cannot be received.

The present invention has been made in view of the above points, and it is an object of the present invention to determine an uplink channel to be transmitted in a case where an uplink grant indicates multiplexing of a response related to retransmission control.

Solution to Problem

According to the disclosed technique, a terminal is provided. The terminal includes: a reception unit configured to receive a grant related to an uplink shared channel from a base station; a control unit configured to determine whether HARQ-ACK (Hybrid automatic repeat request—Acknowledgement) is to be multiplexed with the uplink shared channel in a case where a DAI (Downlink Assignment Index) included in the grant indicates that the HARQ-ACK is to be multiplexed with the uplink shared channel and where a downlink allocation corresponding to the HARQ-ACK that is to be multiplexed with the uplink shared channel is not received; and a transmission unit configured to transmit the uplink shared channel to the base station.

Advantageous Effects of Invention

According to the disclosed technique, a technique is provided that enables determination of an uplink channel to be transmitted in a case where an uplink grant indicates multiplexing of a response related to retransmission control.

DETAILED DESCRIPTION OF THE PREFERRED EMBODIMENTS

Figure 1:
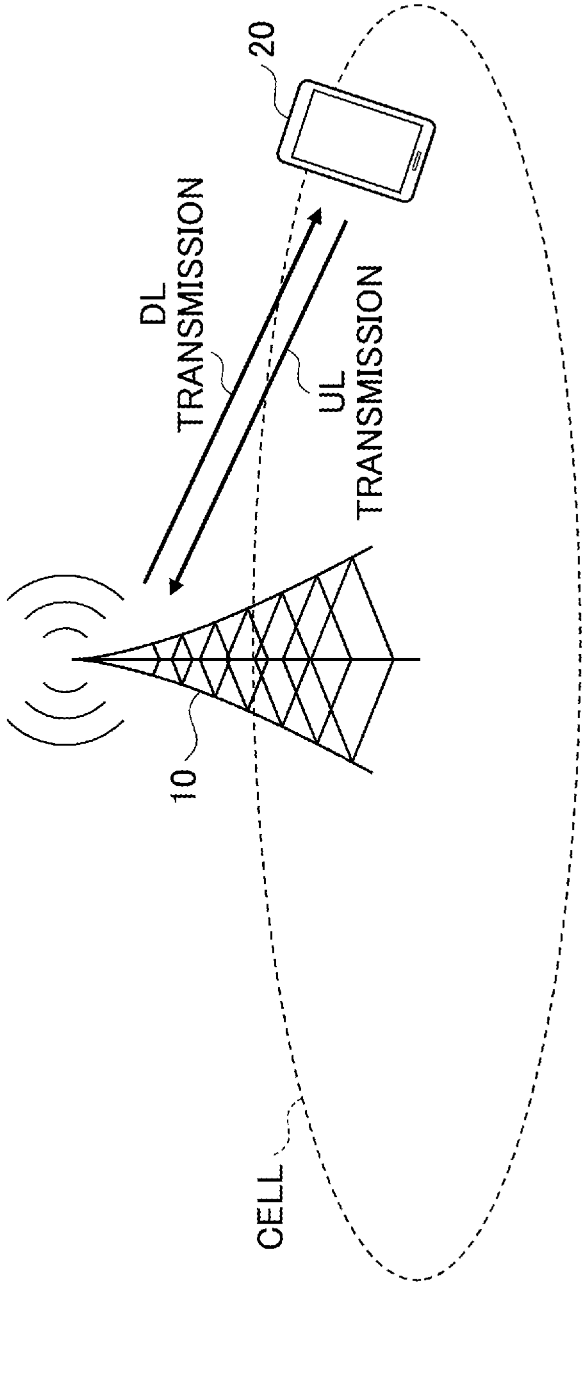
FIG. 1 is a drawing illustrating an example (1) of a wireless communication system according to an embodiment of the present invention.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used accordingly. The conventional techniques include, but not limited to, conventional NR or LTE, for example.

FIG. 1 is a drawing illustrating an example (1) of a wireless communication system according to an embodiment of the present invention. As illustrated in FIG. 1, a wireless communication system according to an embodiment of the present invention includes a base station 10 and a terminal 20. In FIG. 1, a single base station 10 and a single terminal 20 are illustrated as an example. There may be a plurality of base stations 10 and a plurality of terminals 20.

The base station 10 is a communication device that provides one or more cells and performs wireless communications with the terminal 20. Physical resources of the radio signal may be defined in the time domain and the frequency domain, the time domain may be defined by the number of OFDM symbols, and the frequency domain may be defined by the number of sub-carriers or resource blocks. In addition, the TTI (Transmission Time Interval) in the time domain may be a slot, the TTI may be a subframe, or the TTI may be a unit of another name (for example, a subslot).

The base station 10 can perform carrier aggregation to communicate with the terminal 20 by bundling a plurality of cells (multiple CCs (component carriers)). One PCell (primary cell) and one or more SCells (secondary cells) are used in the carrier aggregation.

The base station 10 transmits a synchronization signal, system information, and the like, to the terminal 20. The synchronization signal is, for example, an NR-PSS and an NR-SSS. The system information may be transmitted via a NR-PBCH or a PDSCH, for example, and may be referred to as broadcast information. As shown in FIG. 1, the base station 10 transmits a control signal or data in DL (Downlink) to the terminal 20 and receives a control signal or data in UL (Uplink) from the terminal 20. Note that, here, what is transmitted via a control channel such as PUCCH (Physical Uplink Shared Channel) and PDCCH (Physical Downlink Control Channel) is called a control signal, and what is transmitted via a shared channel such as PUSCH (Physical Uplink Shared Channel) and PDSCH (Physical Downlink Shared Channel) is called data. However, these names are examples.

The terminal 20 may be a communication apparatus that includes a wireless communication function such as a smartphone, a mobile phone, a tablet, a wearable terminal, a communication module for M2M (Machine-to-Machine), or the like. As shown in FIG. 1, the terminal 20 uses various communication services provided by the wireless communication system by receiving control signals or data in DL from the base station 10 and transmitting control signals or data in UL to the base station 10. Note that the terminal 20 may be referred to as a UE, and the base station 10 may be referred to as a gNB.

The terminal 20 can perform carrier aggregation to communicate with the base station 10 by bundling a plurality of cells (a plurality of CCs (component carriers)). One PCell (primary cell) and one or more SCells (secondary cells) are used in the carrier aggregation. In addition, PUCCH-SCell having PUCCH may be used.

Figure 2:
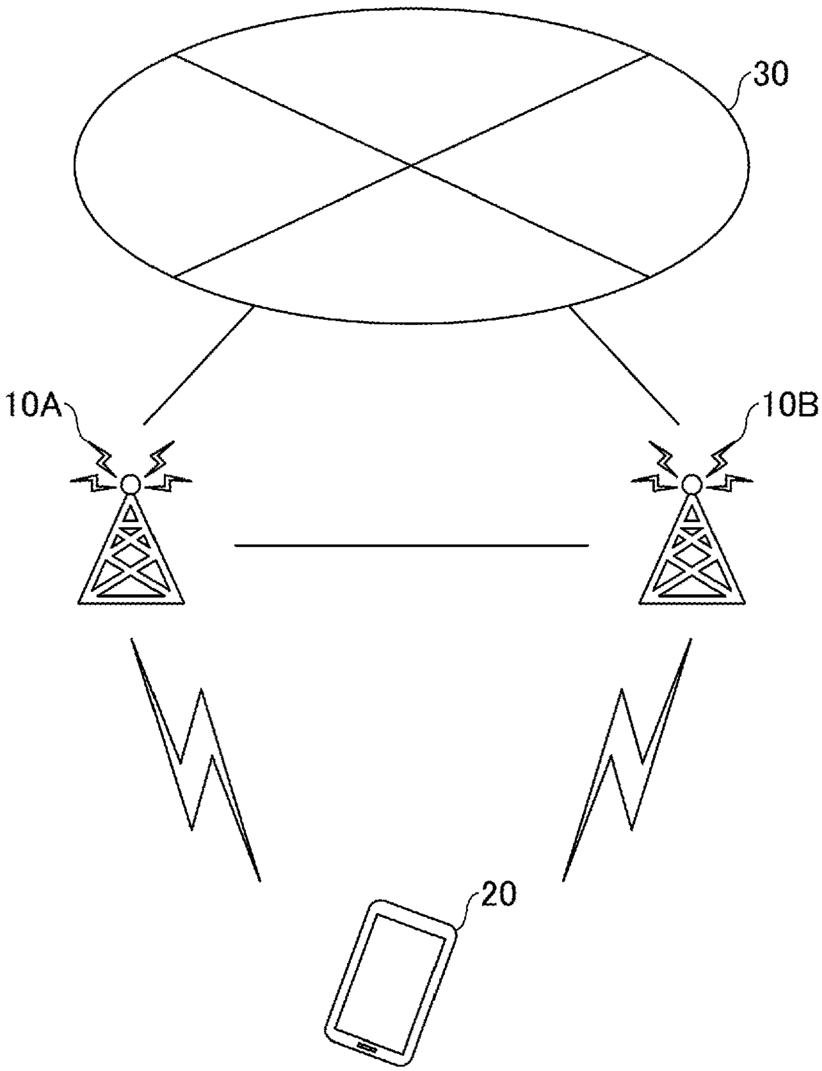
FIG. 2 is a drawing illustrating an example (2) of a wireless communication system according to an embodiment of the present invention.

FIG. 2 is a drawing illustrating an example (2) of a wireless communication system according to an embodiment of the present invention. FIG. 2 shows an example of a configuration of a wireless communication system in a case where DC (Dual connectivity) is performed. As shown in FIG. 2, a base station 10A serving as an MN (Master Node) and a base station 10B serving as an SN (Secondary Node) are provided. The base station 10A and the base station 10B are each connected to a core network. The terminal 20 is enabled to communicate with both the base station 10A and the base station 10B.

A cell group provided by the base station 10A that is an MN is called an MCG (Master Cell Group), and a cell group provided by the base station 10B that is an SN is called an SCG (Secondary Cell Group). In addition, in DC, the MCG includes one PCell and one or more SCells, and the SCG includes one PSCell (Primary SCG Cell) and one or more SCells.

Processing operations in an embodiment of the present invention may be performed in a system configuration shown in FIG. 1, in a system configuration shown in FIG. 2, or in other system configurations.

Here, in NR, regarding the PUSCH scheduling: a configured grant (CG) including type 1 in which configuration is performed in the upper layer and type 2 in which configuration is performed in the upper layer and activation is performed in the lower layer; and a dynamic grant (DG) in which allocation is performed by DCI (Downlink Control Information) in the physical layer, are specified. In addition, in a case where a plurality of UL channels overlap with each other in the time domain, the priority order of the UL channels, a destination UL channel with which control information is to be multiplexed, a UL channel to be dropped, and the like, are determined based on, for example, the type of UL channel and/or the type of control information.

Figure 3:
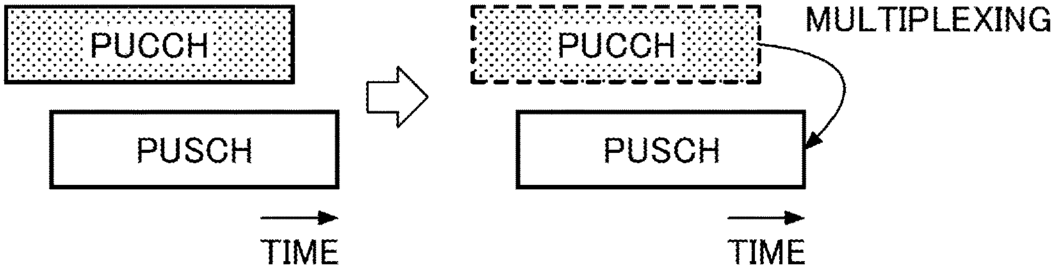
FIG. 3 is a drawing illustrating an example (1) in which UL channels overlap with each other.

FIG. 3 is a drawing illustrating an example (1) in which UL channels overlap with each other. As illustrated in FIG. 3, in a case where PUCCH and PUSCH overlap with each other in the time domain, the terminal 20 may perform operations described in 1) to 3) below. Note that operations described in A1) to A3) below are not required to be performed in a case where repetition is not applied to PUCCH.

A1) In a case where UCI (Uplink Control Information) in PUCCH is HARQ-ACK, as illustrated in FIG. 3, the HARQ-ACK is multiplexed with PUSCH, the PUCCH is dropped, and the PUSCH is transmitted.

A2) In a case where UCI in PUCCH is CSI, if CSI is not included in PUSCH, the CSI is multiplexed with the PUSCH, the PUCCH is dropped, and the PUSCH is transmitted, as illustrated in FIG. 3. In a case where the CSI is included in the PUSCH, the PUCCH is dropped without multiplexing, and the PUSCH is transmitted.

A3) In a case where UCI in PUCCH is SR, if UL-SCH (Uplink Shared Channel) is not included in PUSCH, the PUSCH is dropped, and the PUCCH is transmitted. In a case where the UL-SCH is included in the PUSCH, processing is performed in the MAC (Media Access Control) layer. In the MAC layer, in a case where the logical channel priority processing is not configured, the PUSCH (UL-SCH) is prioritized and the PUCCH (SR) is dropped. When the logical channel priority processing is configured, in a case where the PUSCH is not a PUSCH associated with the random access response, where the PUSCH is not a PUSCH of a message A in the 2-step random access, and where the priority of the logical channel related to the SR is higher than the priority related to the UL-SCH, the PUCCH (SR) is prioritized and the PUSCH (UL-SCH) is dropped, otherwise, the PUSCH (UL-SCH) is prioritized and the PUCCH (SR) is dropped.

Figure 4:
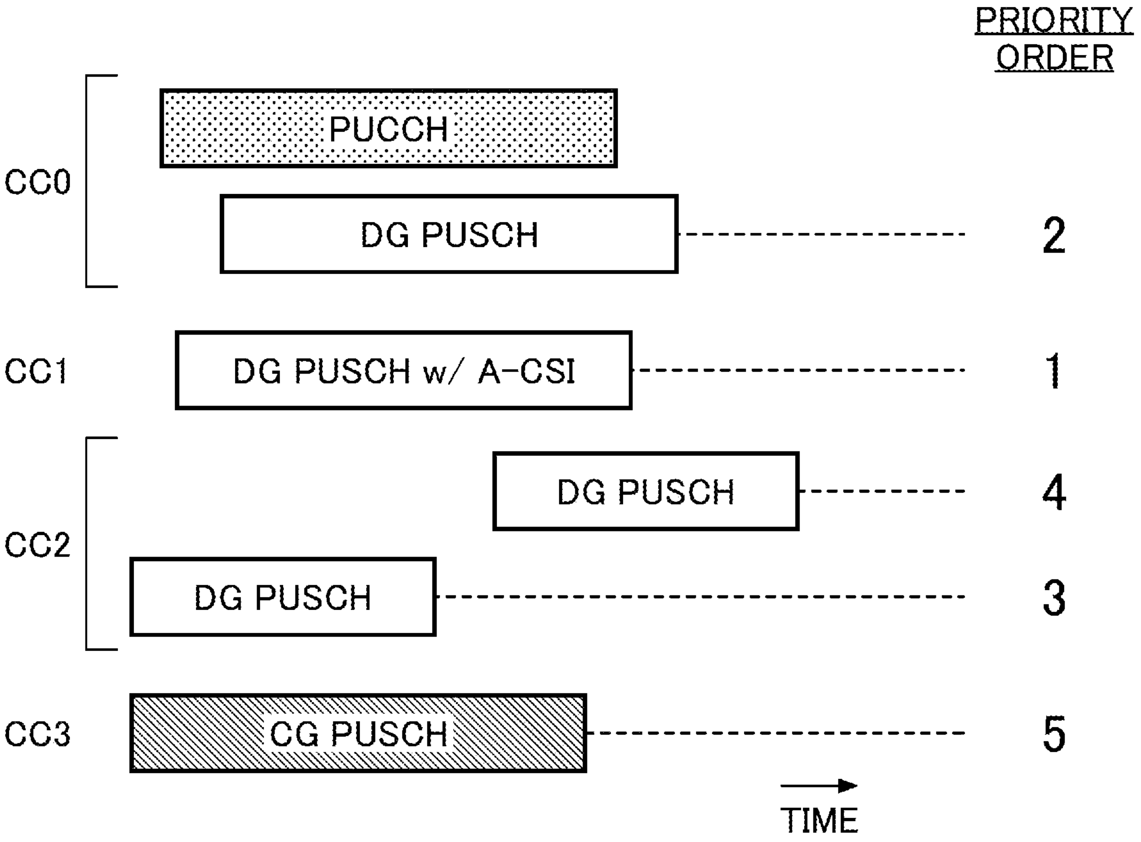
FIG. 4 is a drawing illustrating an example (2) in which UL channels overlap with each other.

FIG. 4 is a drawing illustrating an example (2) in which UL channels overlap with each other. As illustrated in FIG. 4, in a case where PUCCH overlaps with N PUSCHs in the time domain, the terminal 20 may determine one of PUSCHs to which operations described in the above-described A1) to A3) are to be applied, based on rules described in A'1) to A'4) below. Note that the rules are applied both to a case of CA (Carrier Aggregation) and to a case of non-CA. Note that, in a case of CA, the processing with respect to the overlap is limited to CCs in the same PUCCH group. In other words, it is assumed that the PUCCH and the N PUSCHs are located in CCs of the same PUCCH group.

A'1) In a case where there is a PUSCH that is configured to transmit an aperiodic CSI (hereinafter, also referred to as "A-CSI"), the PUSCH is the determined PUSCH.

A'2) In a case where there are $M_1$ ($M_1$ is equal to or greater than one) DG (Dynamic grant)-PUSCHs and $M_2$ ($M_2$ is equal to or greater than one) CG (Configured grant)-PUSCHs, one of the M DG-PUSCHs is the determined PUSCH.

A'3) In a case where there are N PUSCHs across a plurality of serving cells, one of Ma (Ma is equal to or greater than one) PUSCHs in a cell with the lowest serving cell ID is the determined PUSCH.

A'4) A PUSCH whose starting symbol is the earliest among the $M_4$ ($M_4$ is equal to or greater than one) PUSCHs in the same serving cell is the determined PUSCH.

In other words, in an example in FIG. 4, according to A'1), the priority order of DG-PUSCH configured to transmit A-CSI in CC1 is the highest order, 1. According to A'3), the priority order of DG-PUSCH in CC0 is 2. According to A'4), the priority order of preceding DG-PUSCH in CC2 is 3, and the priority order of the subsequent DG-PUSCH is 4. The priority order of CG-PUSCH is 5.

In addition, in a case where a PUSCH resource is allocated, but where there is no data to be transmitted, the terminal 20 may perform operations described in B1) to B2) below.

B1) In a case of CG-PUSCH, the PUSCH transmission may be skipped in a case where MAC PDU includes zero MAC SDU (there is no SDU) and where MAC PDU includes only periodic BSR (Buffer Status Report) and there is no logical channel data, or MAC PDU includes only padding BSR. Skipping the PUSCH transmission can be performed regardless of the configuration by the network.

B2) In a case of DG-PUSCH, the PUSCH transmission may be skipped in a case where the parameter skipUplinkTxDynamic is configured to be "true" and the PUSCH is a PUSCH corresponding to C-RNTI (Cell Radio Network Temporary Identifier), where MAC PDU includes zero MAC SDU (there is no SDU), and where MAC PDU includes only periodic BSR (Buffer Status Report) and there is no logical channel data or MAC PDU includes only padding BSR. In a case other than the above-described cases, the PUSCH transmission cannot be skipped. That is, the terminal 20 generates a null MAC PDU to be transmitted.

In addition, in a case where a PUSCH resource is allocated, but there is no data to be transmitted, and where the PUSCH and PUCCH overlap with each other in the time domain, the terminal 20 may perform operations described in C0) to C2) below.

C0) An operation may be determined depending on the implementation of the terminal 20. That is, in a case where the above-described case occurs, the base station 10 is required to perform blind decoding. Alternatively, the base station 10 performs scheduling in a manner in which the above-described case does not occur.

C1) In a case of DG-PUSCH, the terminal 20 determines which PUSCH is to be multiplexed with UCI by assuming that all PUSCHs are to be transmitted. The terminal 20 cannot skip the PUSCH that is determined to be multiplexed with UCI and must transmit the PUSCH. With respect to the PUSCH that is determined to be multiplexed with UCI, the MAC layer generates MAC PDU. Note that there is no LCH priority order in C1), and a single PHY priority is assumed. No PUSCH repetition may be assumed.

C2) In a case of CG-PUSCH, the terminal 20 determines which PUSCH is to be multiplexed with UCI by assuming that all PUSCHs are to be transmitted. The terminal 20 cannot skip the PUSCH that is determined to be multiplexed with UCI and must transmit the PUSCH. With respect to the PUSCH that is determined to be multiplexed with UCI, the MAC layer generates MAC PDU. Note that there is no LCH priority order in C2), and a single PHY priority and no PUSCH repetition are assumed.

In addition, regarding PUSCH that is configured to transmit SP (Semi Persistent)-CSI, the terminal 20 may perform operations described in D1) or D2) below. Note that a cell may be replaced with a carrier or a CC in the present invention.

D1) In a case where PUSCH configured to transmit SP-CSI and PUSCH including UL-SCH or A-CSI overlap with each other in the time domain in the same cell, the terminal 20 may drop the PUSCH configured to transmit SP-CSI. Note that the piggyback function of moving information from one PUSCH to another PUSCH is not required to be supported.

D2) In a case where PUSCH configured to transmit SP-CSI and PUSCH including UL-SCH or A-CSI do not overlap with each other in the time domain in the same cell, the terminal 20 may transmit the PUSCH configured to transmit SP-CSI.

Note that, in a case where PUSCH configured to transmit SP-CSI and PUCCH overlap with each other, operations or rules described in the above-described A1) to A3) and the above-described A'1) to A'4) may be applied.

Here, the HARQ-ACK codebook may be configured to include HARQ-ACK bits with respect to a unit of at least one of the time domain (for example, slot), frequency domain (for example, component carrier (CC)), spatial domain (for example, layer), transport block (TB), and code block group (CBG) included in TB.

Note that CC is also referred to as cell, serving cell, carrier, etc. In addition, the bits are also referred to as HARQ-ACK bits, HARQ-ACK information, HARQ-ACK information bits, etc. The HARQ-ACK codebook is also referred to as PDSCH-HARQ-ACK codebook (pdsch-HARQ-ACK-Codebook), codebook, HARQ codebook, HARQ-ACK size, etc.

The number (size) of bits included in the HARQ-ACK codebook, or the like, may be determined semi-statically or dynamically. The semi-static HARQ-ACK codebook is also referred to as Type 1 HARQ-ACK codebook, semi-static codebook, etc. The dynamic HARQ-ACK codebook is also referred to as Type 2 HARQ-ACK codebook, dynamic codebook, etc.

Which of the Type 1 HARQ-ACK codebook or Type 2 HARQ-ACK codebook is to be used may be configured to the UE by an upper layer parameter (for example, pdsch-HARQ-ACK-Codebook).

In a case of Type 1 HARQ-ACK codebook, the UE may perform feedback of HARQ-ACK bits corresponding to a predetermined range (a range configured based on the upper layer parameter) regardless of presence or absence of PDSCH scheduling in the predetermined range.

The predetermined range may be defined based on at least one of: a predetermined period (for example, a set of a predetermined number of candidate occasions for PDSCH reception, or, a predetermined number of PDCCH monitoring occasions, m); a number of CCs configured or activated for the UE; a number of TBs (number of layers or ranks); a number of CBGs per one TB; and presence or absence of application of spatial bundling. The predetermined range is also referred to as HARQ-ACK bundling window, HARQ-ACK feedback window, bundling window, feedback window, etc.

In the Type 1 HARQ-ACK codebook, the UE performs feedback of NACK bits even in a case where there is no PDSCH scheduling for the UE in the predetermined range. As a result, in a case where the Type 1 HARQ-ACK codebook is used, the number of HARQ-ACK bits to be used as the feedback is expected to be increased.

On the other hand, in a case of Type 2 HARQ-ACK codebook, the UE may perform feedback of HARQ-ACK bits corresponding to the scheduled PDSCH in the above-described predetermined range.

Specifically, the UE may determine the number of bits of the Type 2 HARQ-ACK codebook, based on the predetermined field in DCI (for example, Downlink Assignment Indicator (Index) (DAI) field). The DAI field may be split into a counter DAI (cDAI) and a total DAI (tDAI).

The counter DAI may indicate a counter value of downlink transmissions (PDSCH, data, TB) that are scheduled in the predetermined period. For example, the counter DAI in DCI for scheduling data in the predetermined period may indicate the number that is counted first in the frequency domain (for example, CC) and then, counted in the time domain in the predetermined period.

The total DAI may indicate a total value (sum) of data items that are scheduled in the predetermined period. For example, the total DAI in DCI for scheduling data using a predetermined time unit (for example, PDCCH monitoring occasion) in the predetermined period may indicate the sum of data items that are scheduled before a predetermined time unit (also referred to as a point, timing, or the like) in the predetermined period.

The UE may transmit one or more HARQ-ACK bits that are determined (generated) based on the above-described Type 1 HARQ-ACK codebook or Type 2 HARQ-ACK codebook by using at least one of an uplink control channel (PUCCH) and an uplink shared channel (PUSCH).

Here, in NR, in a case where PUCCH including HARQ-ACK (Hybrid automatic repeat request—Acknowledgement) overlaps with one or more PUSCHs at least in a time domain, the HARQ-ACK is multiplexed with one of the PUSCHs. The number of HARQ-ACK bits to be multiplexed with PUSCH is determined based on the DAI (Downlink Assignment Index) included in a UL grant that is DCI (Downlink Control Information) that schedules PUSCH. Hereinafter, the DAI included in a UL grant is described as UL-DAI.

Figure 5:
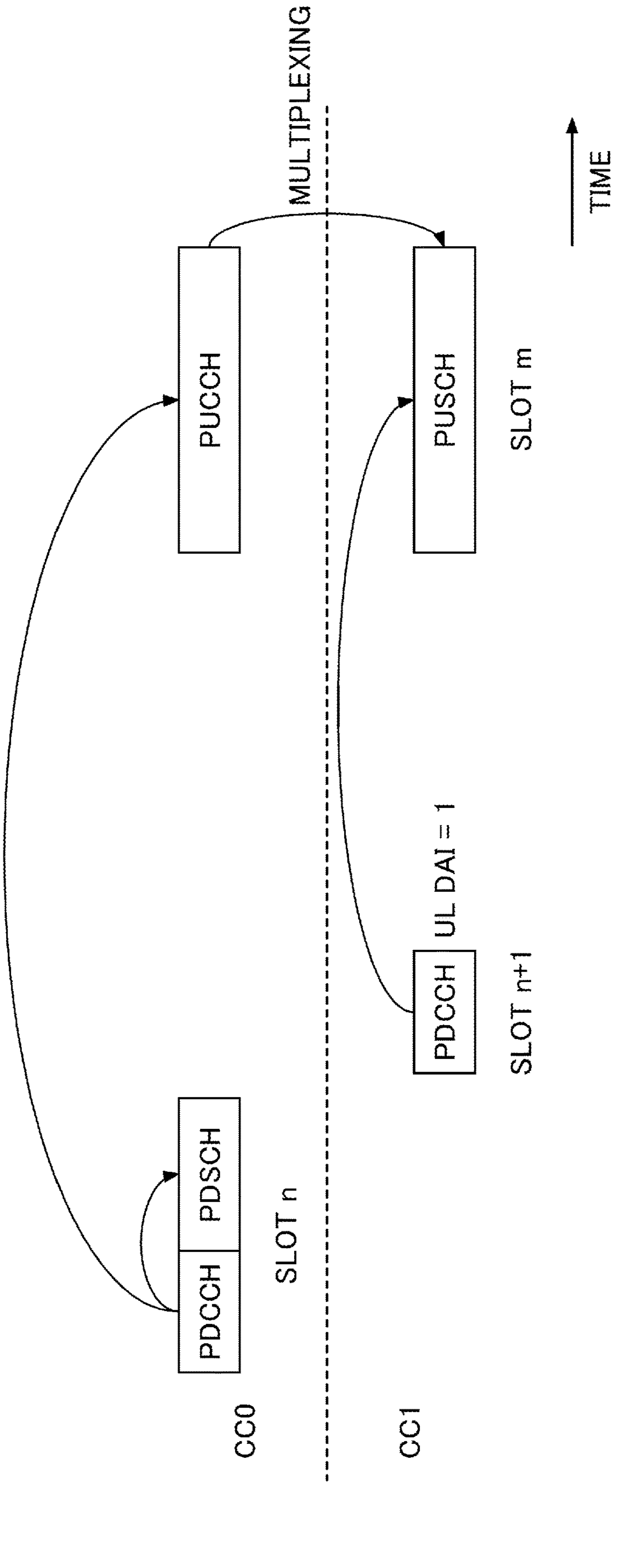
FIG. 5 is a drawing illustrating an example (3) in which UL channels overlap with each other.

FIG. 5 is a drawing illustrating an example (3) in which UL channels overlap with each other. As illustrated in FIG. 5, in a case where, in CC0, PUCCH including HARQ-ACK corresponding to PDCCH and PDSCH to be received in slot n is arranged in slot m, where, in CC1, PUSCH scheduled by PDCCH to be received in slot n+1 in which UL-DAI=1 is configured is arranged in slot m, and where the PUCCH and the PUSCH overlap with each other, the HARQ-ACK that has been scheduled to be transmitted by the PUCCH is multiplexed with the PUSCH to be transmitted.

Figure 6:
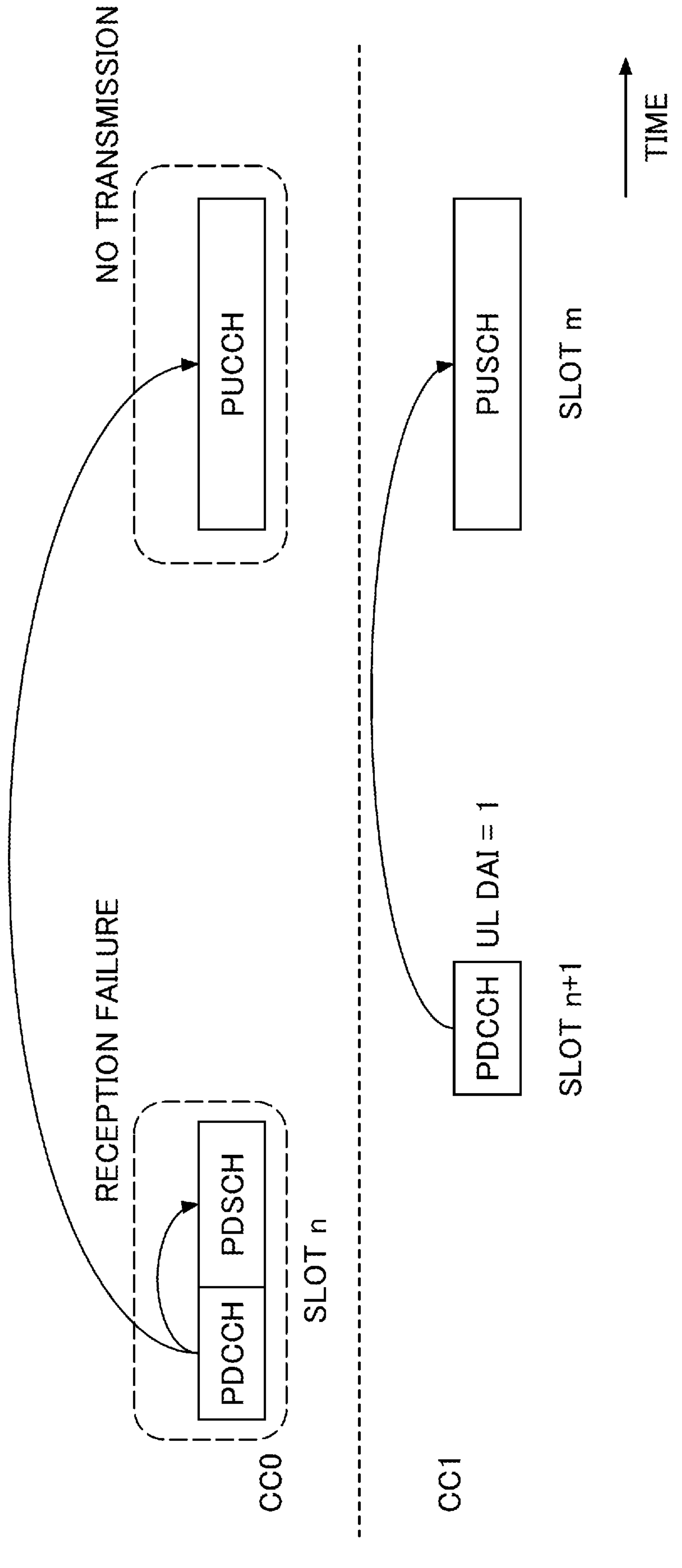
FIG. 6 is a drawing illustrating an example (4) in which UL channels overlap with each other.

FIG. 6 is a drawing illustrating an example (4) in which UL channels overlap with each other. As illustrated in FIG. 6, for example, in a case where the DAI included in a UL grant in slot n+1 in CC1 indicates multiplexing (for example, UL-DAI=1), where the UL grant schedules PUSCH in slot m, and where a PDCCH that schedules a PDSCH corresponding to the HARQ-ACK is not received in any slot in any CC, that is, in a case where there is no PUCCH including the HARQ-ACK that overlaps with the PUSCH, whether HARQ-ACK is to be multiplexed with PUSCH in slot m in CC1 has not been specified.

Figure 7:
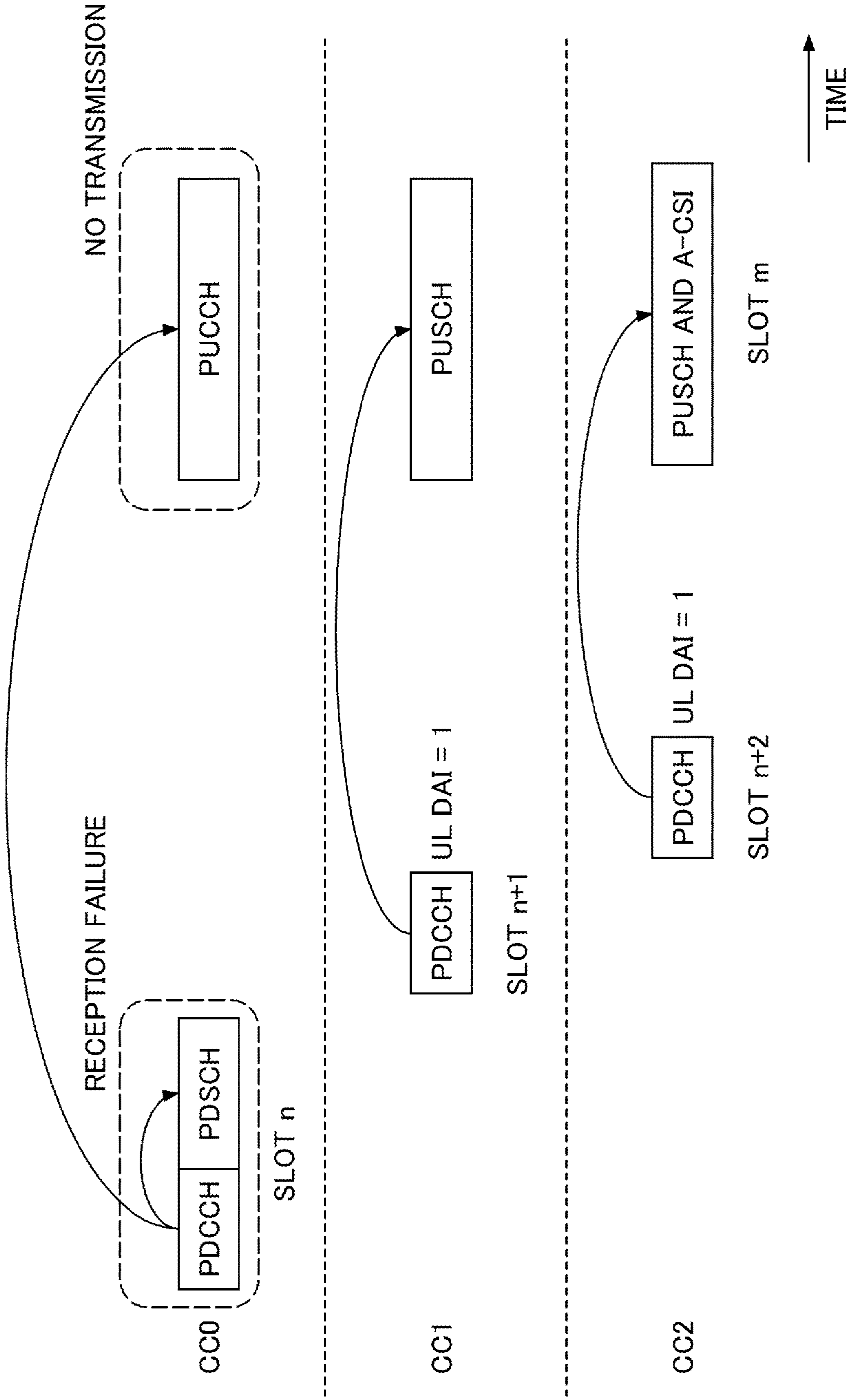
FIG. 7 is a drawing illustrating an example (5) in which UL channels overlap with each other.

FIG. 7 is a drawing illustrating an example (5) in which UL channels overlap with each other. As illustrated in FIG. 7, in a case where PUSCH in slot m is scheduled by PDCCH in which UL-DAI indicates multiplexing (for example, UL-DAI=1 is configured) in slot n+1 in CC1, where PUSCH and A-CSI in slot m is scheduled by PDCCH in which UL-DAI indicates multiplexing (for example, UL-DAI=1 is configured) in slot n+2 in CC2, and where PDCCH that schedules PDSCH corresponding to the HARQ-ACK is not received in any slot in any CC, that is, in a case where there is no PUCCH including HARQ-ACK that overlaps with the two PUSCHs, how to transmit PUSCH in slot m in CC1 and PUSCH in slot m in CC2 (that is, whether HARQ-ACK is to be multiplexed) has not been specified.

In addition, it is necessary to specify a UE operation in a manner in which a transmission operation of HARQ-ACK and/or PUSCH is clarified even in a case where some of UL grants indicating multiplexing of HARQ-ACK are not received by the terminal 20.

Note that, each embodiment of the present invention described below may be applied to channels with the same priority. The priority may be priority of any of PHY and MAC.

Note that "UL-DAI of a UL grant indicates multiplexing of HARQ-ACK" in a case where there is no DL allocation may mean that UL-DAI=1 when Type 1 HARQ-ACK codebook is used, or may mean that UL-DAI=1, 2, or 3 when Type 2 HARQ-ACK codebook is used.

Note that "UL-DAI of a UL grant indicates no multiplexing of HARQ-ACK" in a case where there is no DL allocation may mean that UL-DAI=0 when Type 1 HARQ-ACK codebook is used, or may mean that UL-DAI=4 when Type 2 HARQ-ACK codebook is used.

Table 1 is an example of DAI in Type 2 HARQ-ACK codebook.

TABLE 1

| DAI MSB, LSB | $V^{UL}_{T\text{-}DAI}$ |
|---|---|
| 0, 0 | 1 |
| 0, 1 | 2 |
| 1, 0 | 3 |
| 1, 1 | 4 |

As illustrated in Table 1, in a case where Type 2 HARQ-ACK codebook is used, the DAI field in the UL grant may include two bits, and UL-DAI=1 when (MSB, LSB) is (0, 0), UL-DAI=2 when (MSB, LSB) is (0, 1), UL-DAI=3 when (MSB, LSB) is (1, 0), and UL-DAI=4 when (MSB, LSB) is (1, 1).

Figure 8:
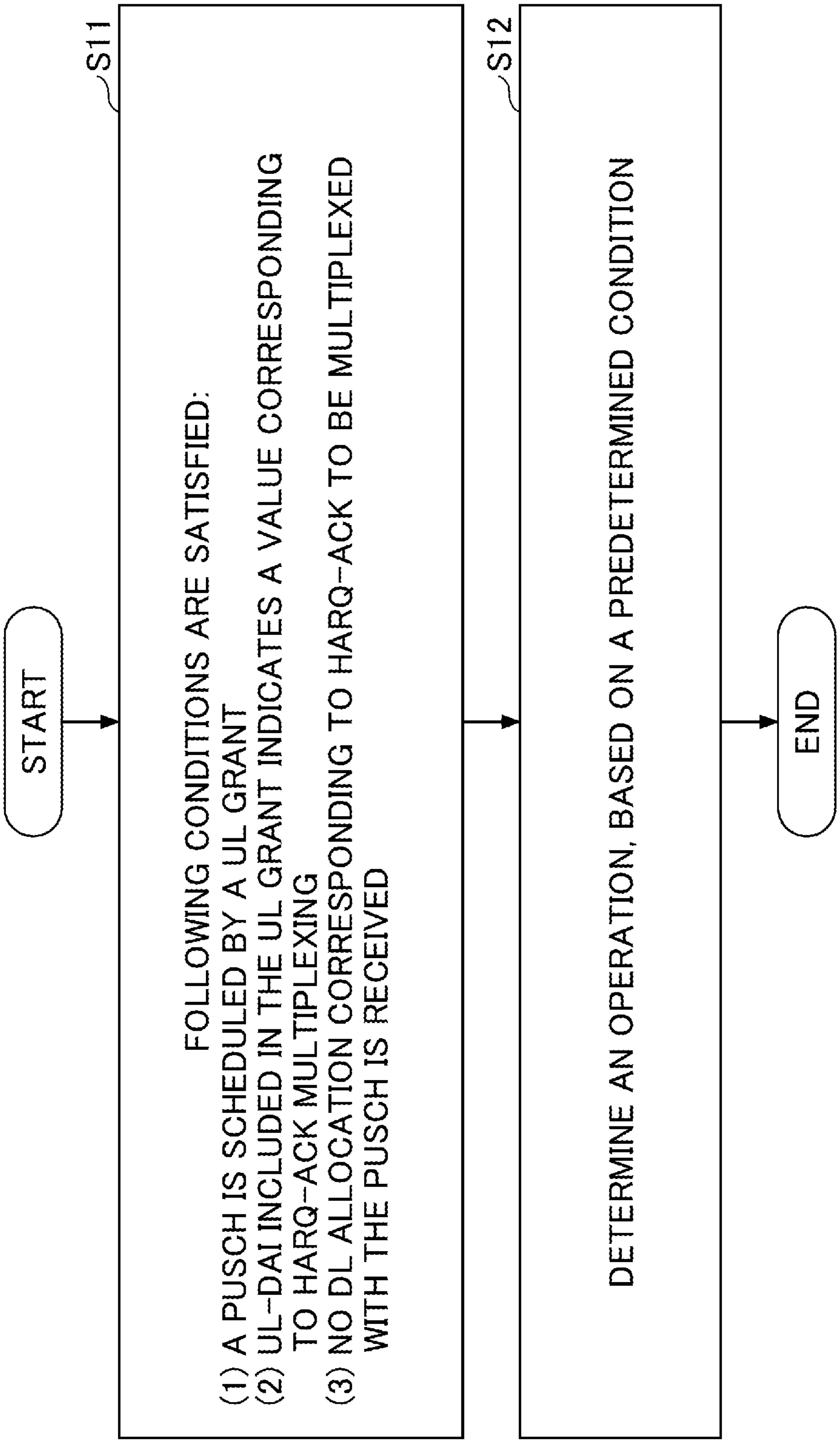
FIG. 8 is a flowchart illustrating an example (1) of UL transmission in an embodiment of the present invention.

FIG. 8 is a flowchart illustrating an example (1) of UL transmission in an embodiment of the present invention. As illustrated in step S11, conditions described in 1) to 3) below are assumed to be satisfied in the terminal 20.

1) A PUSCH is scheduled by a UL grant.

2) UL-DAI included in the UL grant indicates a value corresponding to multiplexing of HARQ-ACK.

3) No DL allocation corresponding to HARQ-ACK to be multiplexed with the PUSCH is received.

In subsequent step S12, the terminal 20 determines an operation, based on a predetermined condition. Note that, in a case of PUSCH repetition, the terminal 20 may apply step S12 to a particular transmission alone, or may apply step S12 to all transmissions.

Figure 9:
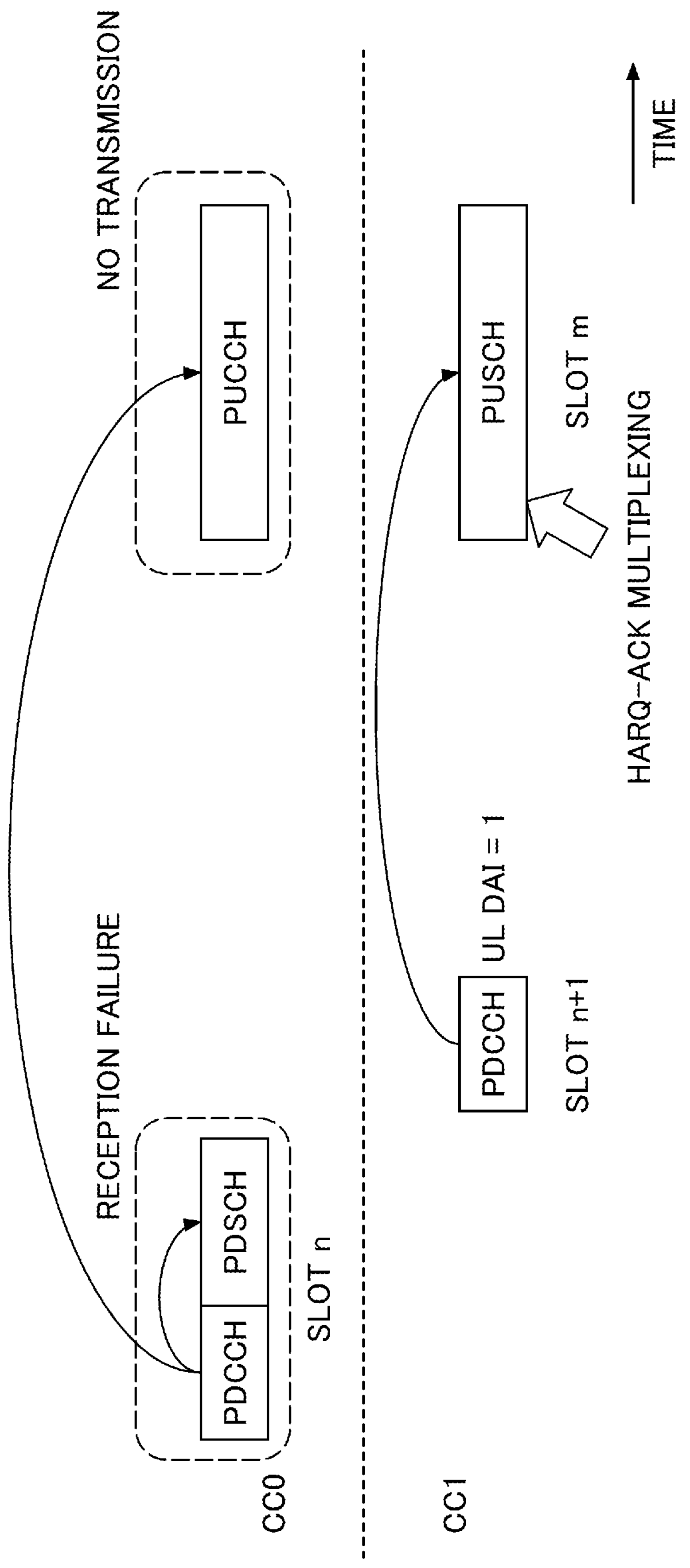
FIG. 9 is a drawing illustrating an example (1-1) of UL transmission in an embodiment of the present invention.

FIG. 9 is a drawing illustrating an example (1-1) of UL transmission in an embodiment of the present invention. For example, the predetermined condition in step S12 may be a case in which there is only one PUSCH in the slot (slot m in FIG. 9). In a case where the predetermined condition is satisfied, as illustrated in FIG. 9, the terminal 20 may multiplex HARQ-ACK with the PUSCH. That is, HARQ-ACK may be multiplexed with the PUSCH regardless of whether there is an overlap with respect to PUCCH including HARQ-ACK. The same will be applied to an embodiment described below.

Note that in a case where numerologies are different depending on CCs or cells, a slot in a cell in which the smallest SCS is configured may be determined to be the target slot of the condition in step S12. The same will be applied to an embodiment described below.

According to the operation as described above, an operation of the terminal 20 is determined and there is no need for blind decoding on the base station 10 side.

When there are a plurality of PUSCHs in the slot, the predetermined condition in step S12 may be a case in which the UL-DAI indicates a value corresponding to HARQ-ACK multiplexing in only one UL grant among corresponding UL grants and the UL-DAI indicates no HARQ-ACK multiplexing in the remaining UL grants. In a case where the predetermined condition is satisfied, the terminal 20 may multiplex HARQ-ACK with PUSCH that is scheduled by a UL grant in which the UL-DAI is a value corresponding to HARQ-ACK multiplexing.

In addition, when there are a plurality of PUSCHs in a slot, the predetermined condition in step S12 may be a case in which the UL-DAI indicates a value corresponding to HARQ-ACK multiplexing in two or more corresponding UL grants. In a case where the predetermined condition is satisfied, the terminal 20 may perform HARQ-ACK multiplexing in all PUSCHs that are scheduled by UL grants in which the UL-DAI is a value corresponding to HARQ-ACK multiplexing.

Figure 10:
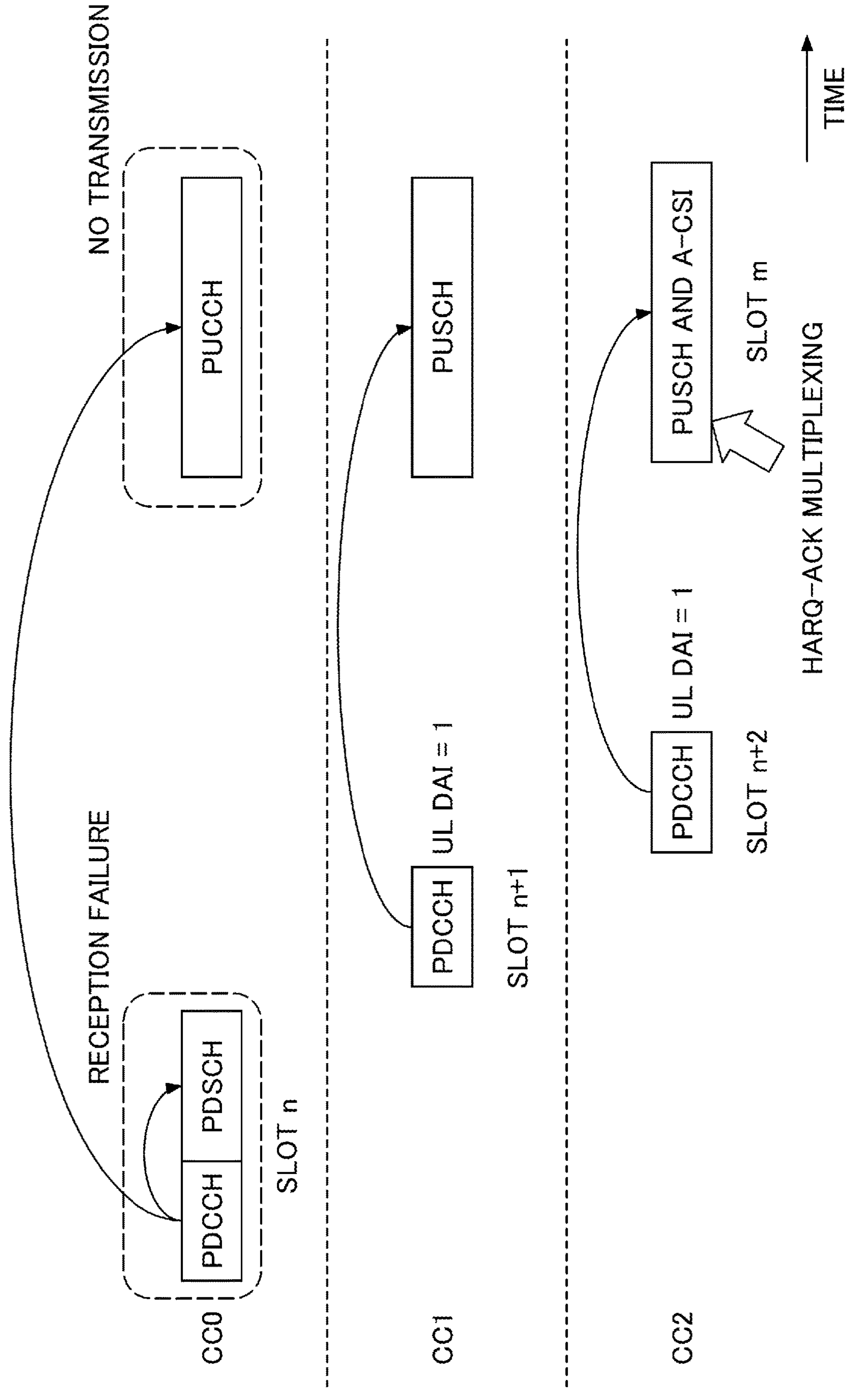
FIG. 10 is a drawing illustrating an example (1-2) of UL transmission in an embodiment of the present invention.

In addition, when there are a plurality of PUSCHs in a slot, the predetermined condition in step S12 may be a case in which the UL-DAI indicates a value corresponding to HARQ-ACK multiplexing in two or more corresponding UL grants. FIG. 10 is a drawing illustrating an example (1-2) of UL transmission in an embodiment of the present invention. As illustrated in FIG. 10, in a case where the predetermined condition is satisfied, the terminal 20 may perform HARQ-ACK multiplexing in one of PUSCHs that are scheduled by UL grants in which the UL-DAI is a value corresponding to HARQ-ACK multiplexing.

The one of PUSCHs may be a PUSCH that is determined based on a rule for determining the UCI multiplexing destination, or may be a PUSCH corresponding to a UL grant that is received last in the time domain. The rule for determining the UCI multiplexing destination may mean, for example, PUSCH including A-CSI is prioritized as the first rule, DG-PUSCH is prioritized over CG-PUSCH as the second rule, PUSCH with a smaller serving cell index is prioritized as the third rule, and PUSCH whose starting symbol is earlier is prioritized as the fourth rule.

In addition, when there are a plurality of PUSCHs in a slot, a case in which the UL-DAI indicates a value corresponding to HARQ-ACK multiplexing in two or more corresponding UL grants may be treated as an error case. In other words, when there are a plurality of PUSCHs in the slot, the terminal 20 may assume a case in which the UL-DAI indicates a value corresponding to HARQ-ACK multiplexing in only one corresponding UL grant without assuming a case in which the UL-DAI indicates a value corresponding to HARQ-ACK multiplexing in two or more corresponding UL grants.

Note that the case in which there are a plurality of PUSCHs in a slot may be limited to a case in which PUSCHs overlap with each other, or may include a case in which PUSCHs do not overlap with each other.

According to the operation as described above, an operation of the terminal 20 is determined and there is no need for blind decoding on the base station 10 side.

In addition, the predetermined condition in step S12 may be a case where there are a plurality of PUSCHs in a slot, where subslot-based PUCCH is used, where the DL allocation corresponding to HARQ-ACK to be multiplexed with the PUSCH is limited to some subslots (that is, there is PUCCH including HARQ-ACK in zero or more subslots, and there is no PUCCH including HARQ-ACK in the remaining subslots), and where the UL-DAI indicates a value corresponding to HARQ-ACK multiplexing in two or more UL grants among the corresponding UL grants.

Figure 11:
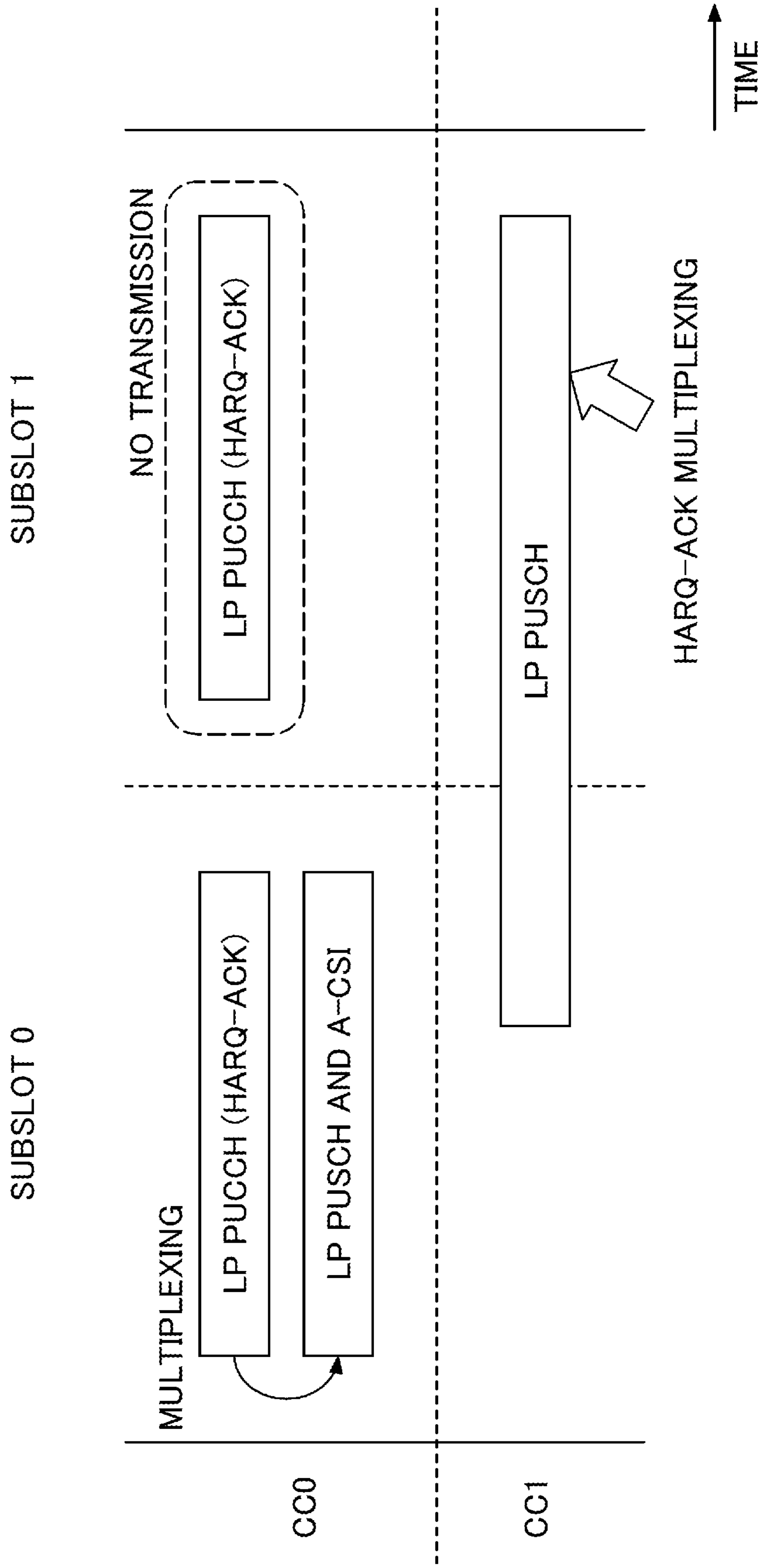
FIG. 11 is a drawing illustrating an example (1-3) of UL transmission in an embodiment of the present invention.

FIG. 11 is a drawing illustrating an example (1-3) of UL transmission in an embodiment of the present invention. As illustrated in FIG. 11, HARQ-ACK multiplexing may be performed in all PUSCHs corresponding to the two or more UL grants. For example, in a case where there is PUCCH including HARQ-ACK in a subslot, the HARQ-ACK may be multiplexed with PUSCH with which the HARQ-ACK is to be multiplexed, and NACK may be multiplexed with remaining PUSCHs with which there is no HARQ-ACK to be multiplexed. Note that LP-PUCCH in FIG. 11 indicates a PUCCH with low priority and LP-PUSCH indicates a PUSCH with low priority.

In addition, the predetermined condition in step S12 may be a case where there are a plurality of PUSCHs in a slot, where subslot-based PUCCH is used, where the DL allocation corresponding to HARQ-ACK to be multiplexed with the PUSCH is limited to some subslots (that is, there is PUCCH including HARQ-ACK in zero or more subslots, and there is no PUCCH including HARQ-ACK in the remaining subslots), and where the UL-DAI indicates a value corresponding to HARQ-ACK multiplexing in two or more UL grants among the corresponding UL grants. HARQ-ACK multiplexing may be performed in some PUSCHs among PUSCHs corresponding to the two or more UL grants. For example, in a case where there is PUCCH including HARQ-ACK in a subslot, the HARQ-ACK may be multiplexed with PUSCH with which the HARQ-ACK is to be multiplexed, and multiplexing is not required to be performed in the remaining PUSCHs with which there is no HARQ-ACK to be multiplexed.

In addition, a case: where there are a plurality of PUSCHs in a slot; where subslot-based PUCCH is used, where the DL allocation corresponding to HARQ-ACK to be multiplexed with the PUSCH is limited to some subslots (that is, there is PUCCH including HARQ-ACK in zero or more subslots, and there is no PUCCH including HARQ-ACK in the remaining subslots); and where the UL-DAI indicates a value corresponding to HARQ-ACK multiplexing in two or more UL grants among the corresponding UL grants, may be treated as an error case.

In addition, an operation in step S12 may be changed based on the number of bits of HARQ-ACK or UCI (for example, HARQ-ACK and CSI). In a case where the Type 1 HARQ-ACK codebook is used, the number of HARQ-ACK bits may be a number of bits determined based on configuration of the TDRA table and K1 value candidates. K1 may be a slot offset from PDSCH reception to PUCCH transmission, and may be a value indicated by the PDSCH-to-HARQ_feedback timing indicator field. In addition, in a case where the Type 2 HARQ-ACK codebook is used, the number of HARQ-ACK bits may be a number of bits corresponding to (determined based on) the value of UL-DAI. Note that the operation in step S12 may be applied to a case in which there is only one PUSCH in a slot in which PUSCH is arranged, or may be applied to a case in which there are a plurality of PUSCHs.

In a case where the number of bits of HARQ-ACK or UCI is one or two bits, the multiplexing may be, or is not required to be, applied to PUSCH, based on the UL-DAI. Alternatively, in a case where the number of bits of HARQ-ACK or UCI is one or two bits, the multiplexing may be, or is not required to be, applied to PUSCH, based on the UE implementation.

Note that, when Type 2 HARQ-ACK codebook is used, the case where the number of bits of HARQ-ACK or UCI is one or two bits may be a case in which UL-DAI=1 or 2, or may be a case in which, if there is a second UL-DAI in the UL grant, (first UL-DAI, second UL-DAI)=(4, 1), (1, 4), (1, 1), (4, 2), (2, 4).

The terminal 20 may perform an operation in step S12 as described above by combining with one of the conditions in the above-described step S12. In a case where the number of bits of HARQ-ACK or UCI is 1 or 2 bits, according to the above-described operation in step S12, multiplexing is performed by puncturing in any case, and thus, the base station 10 is enabled to perform UL-SCH decoding without blind decoding.

In a case where the number of bits of HARQ-ACK or UCI is equal to or greater than 3 bits (for example, may be a case in which UCI is HARQ-ACK and CSI), the terminal 20 may perform one of 1) to 3) described below as an operation in step S12.

1) May be processed as an error case, or may be processed based on the UE implementation.

2) May be processed as an error case, or may be processed based on the UE implementation in a case where HARQ-ACK alone includes three or more bits.

3) In a case where HARQ-ACK and CSI (or A-CSI) include three or more bits, multiplexing may be performed to PUSCH, based on the UL-DAI.

The terminal 20 may perform an operation in step S12 as described above by combining with one of the conditions in the above-described step S12. In a case where the number of bits of HARQ-ACK or UCI is equal to or greater than 3 bits, when an operation in the above-described S12 is performed, the blind decoding occurs in a case where multiplexing is performed to PUSCH according to the rate matching, and thus, it is desirable to avoid the blind decoding by using the scheduling. Note that, in a case where there is PUSCH including A-CSI, the multiplexing destination of UCI is determined to be the PUSCH including A-CSI, and thus, the base station 10 and the terminal 20 are enabled to share the same understanding.

In addition, the terminal 20 may receive a bit related to the necessity of UCI multiplexing in the UL grant. Note that, hereinafter, "needed" of UCI multiplexing is indicated by, but not limited to, "1", and "not needed" of UCI multiplexing is indicated by, but not limited to, "0". The UCI may be HARQ-ACK or may be CSI.

In a case where the bit "1" related to the necessity of UCI multiplexing is received in the UL grant, the terminal 20 may perform UCI multiplexing to PUSCH corresponding to the UL grant indicating the "1". In addition, in a case where the bit "1" related to the necessity of UCI multiplexing is received in a plurality of UL grants, the terminal 20 may perform UCI multiplexing to all corresponding PUSCHs, may perform UCI multiplexing to a PUSCH corresponding to a UL grant that is received last in the time domain, or may perform multiplexing to a PUSCH that is determined based on a rule for determining the destination of UCI multiplexing. The rule for determining the UCI multiplexing destination may mean, for example, PUSCH including A-CSI is prioritized as the first rule, DG-PUSCH is prioritized over CG-PUSCH as the second rule, PUSCH with a smaller serving cell index is prioritized as the third rule, and PUSCH whose starting symbol is earlier is prioritized as the fourth rule.

As described above, the UCI multiplexing destination becomes clear by receiving a bit related to the necessity of UCI multiplexing in the UL grant, and thus, an operation of the terminal 20 can be simplified, and the base station 10 is enabled to avoid blind decoding.

Figure 12:
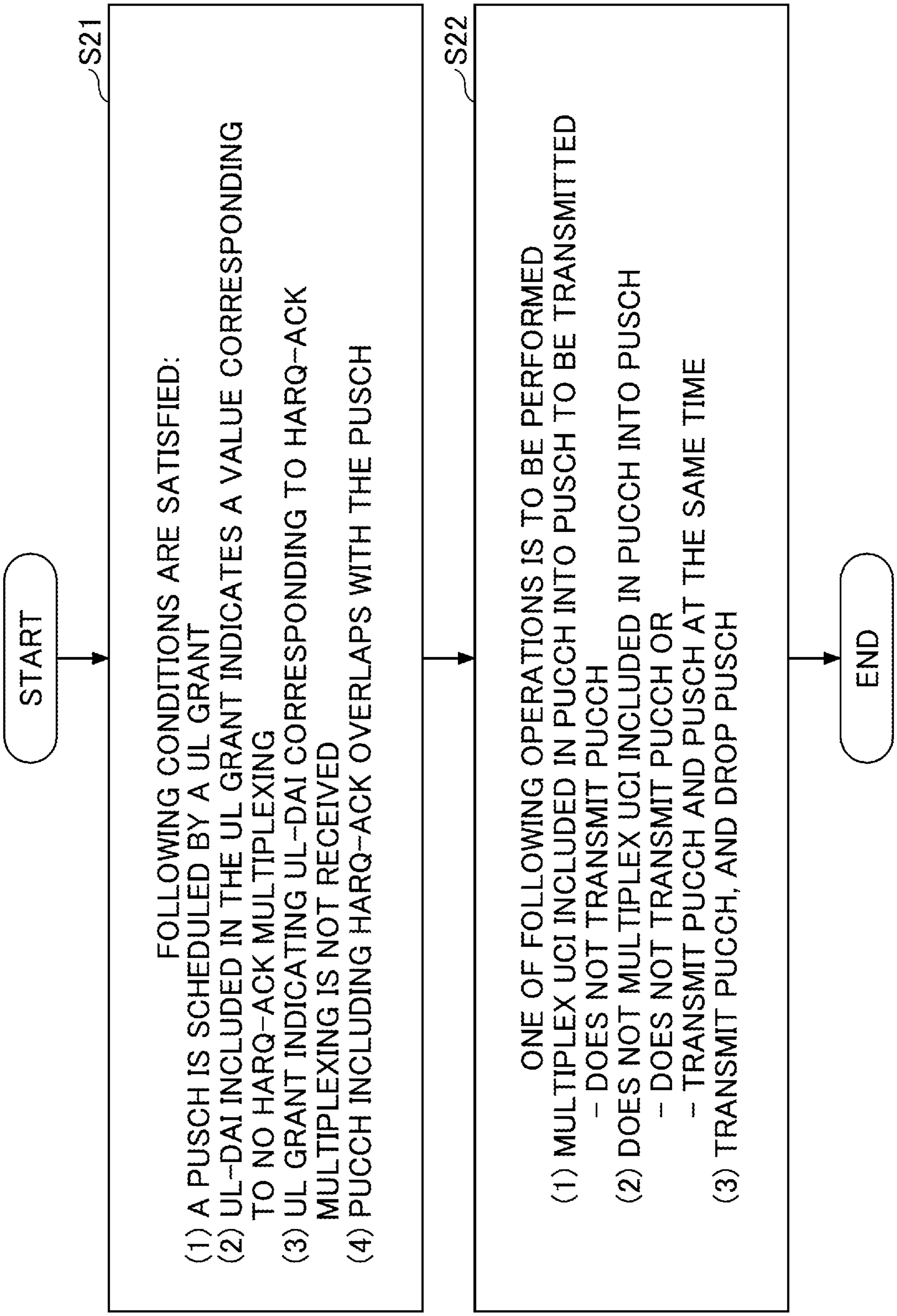
FIG. 12 is a flowchart illustrating an example (2) of UL transmission in an embodiment of the present invention.

FIG. 12 is a flowchart illustrating an example (2) of UL transmission in an embodiment of the present invention. As illustrated in step S21, conditions described in 1) to 4) below are assumed to be satisfied in the terminal 20.

1) A PUSCH is scheduled by a UL grant.

2) UL-DAI included in the UL grant indicates a value corresponding to no HARQ-ACK multiplexing.

3) UL grant indicating the UL-DAI corresponding to HARQ-ACK multiplexing has not been received.

4) PUCCH including HARQ-ACK overlaps with the PUSCH.

In subsequent step S22, the terminal 20 perform one of operations described in 1) to 3) below.

1) UCI included in PUCCH is multiplexed with PUSCH to be transmitted

PUCCH is not transmitted

2) UCI included in PUCCH is not multiplexed with PUSCH

PUCCH is not transmitted, or

PUCCH and PUSCH are transmitted at the same time

3) PUCCH is transmitted and PUSCH is dropped

Figure 13:
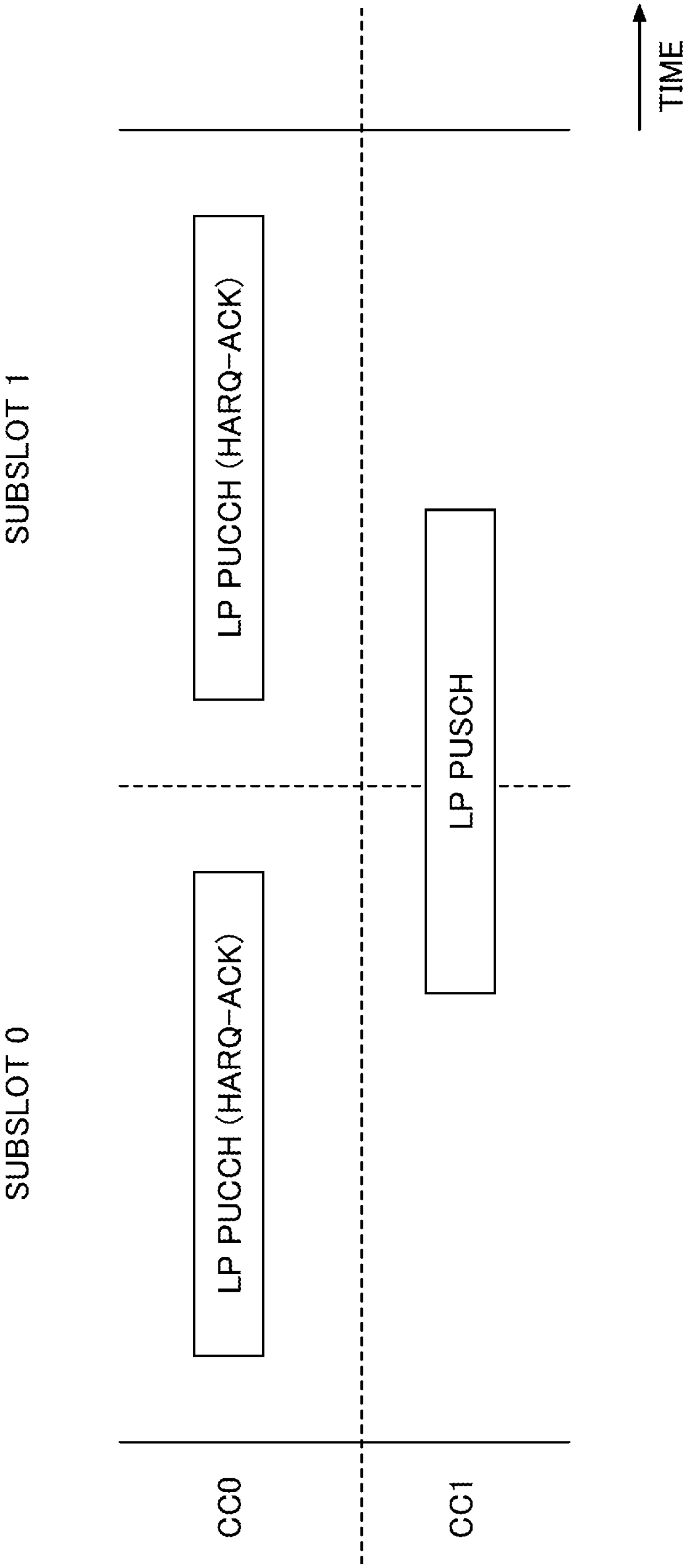
FIG. 13 is a drawing illustrating an example (2-1) of UL transmission in an embodiment of the present invention.

FIG. 13 is a drawing illustrating an example (2-1) of UL transmission in an embodiment of the present invention. As illustrated in FIG. 13, the terminal 20 is not required to multiplex UCI included in PUCCH with PUSCH. The terminal 20 may transmit PUCCH and PUSCH at the same time, or may transmit PUSCH without transmitting PUCCH.

Figure 14:
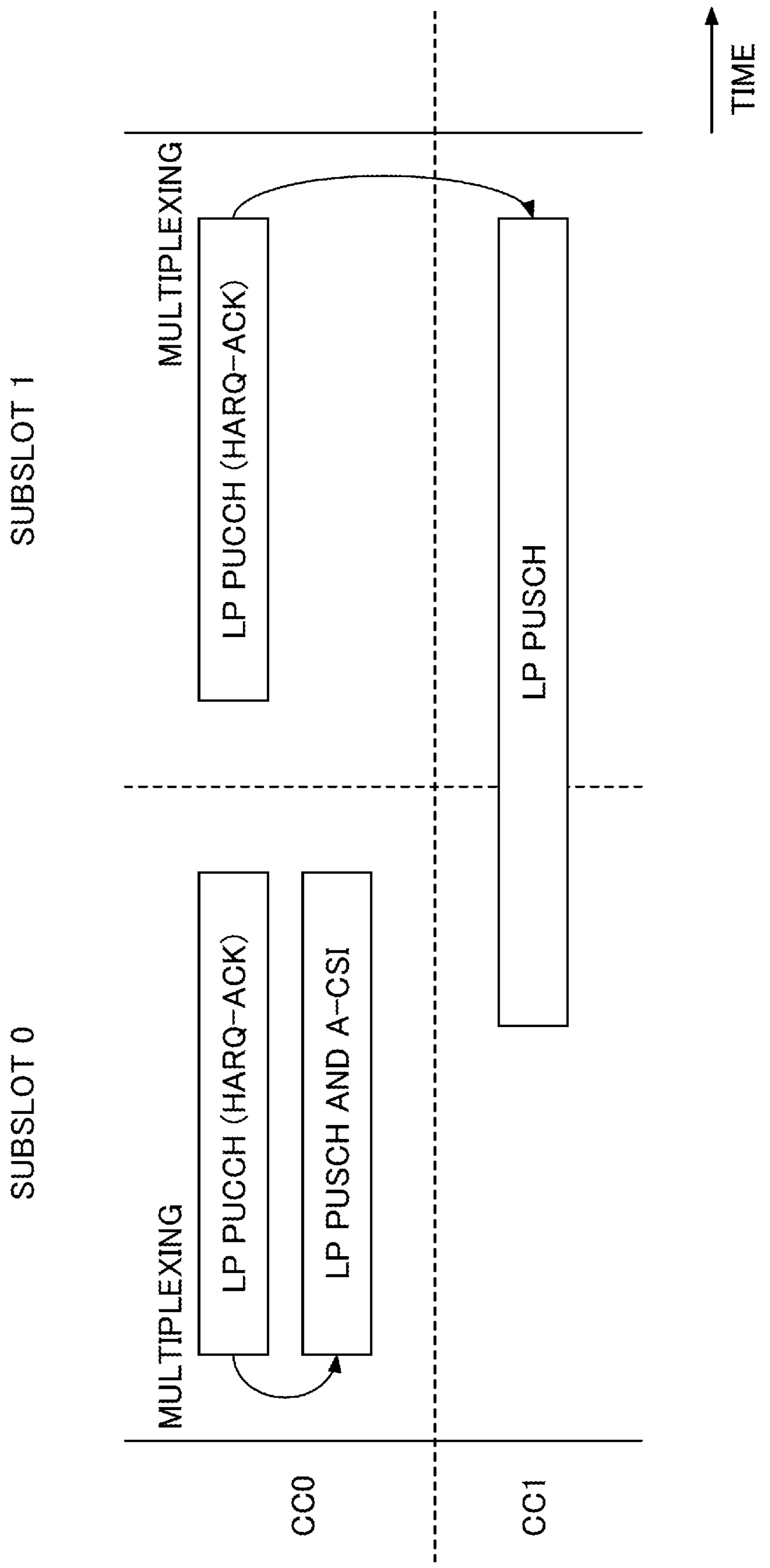
FIG. 14 is a drawing illustrating an example (2-2) of UL transmission in an embodiment of the present invention.

FIG. 14 is a drawing illustrating an example (2-2) of UL transmission in an embodiment of the present invention. As illustrated in FIG. 14, the terminal 20 may multiplex UCI included in PUCCH with PUSCH to be transmitted.

According to the above-described embodiment, an operation of the terminal 20 can be clarified even in a case where a channel cannot be received in an operation of multiplexing HARQ-ACK or UCI with PUSCH.

That is, in a case where an uplink grant indicates multiplexing of a response related to retransmission control, an uplink channel to be transmitted can be determined.

(Device Configuration)

Next, a functional configuration example of the base station 10 and the terminal 20 for performing the processes and operations described above will be described. The base station 10 and terminal 20 include functions for implementing the embodiments described above. It should be noted, however, that each of the base stations 10 and the terminal 20 may include only proposed functions in one of the embodiments.

<Base Station 10>

Figure 15:
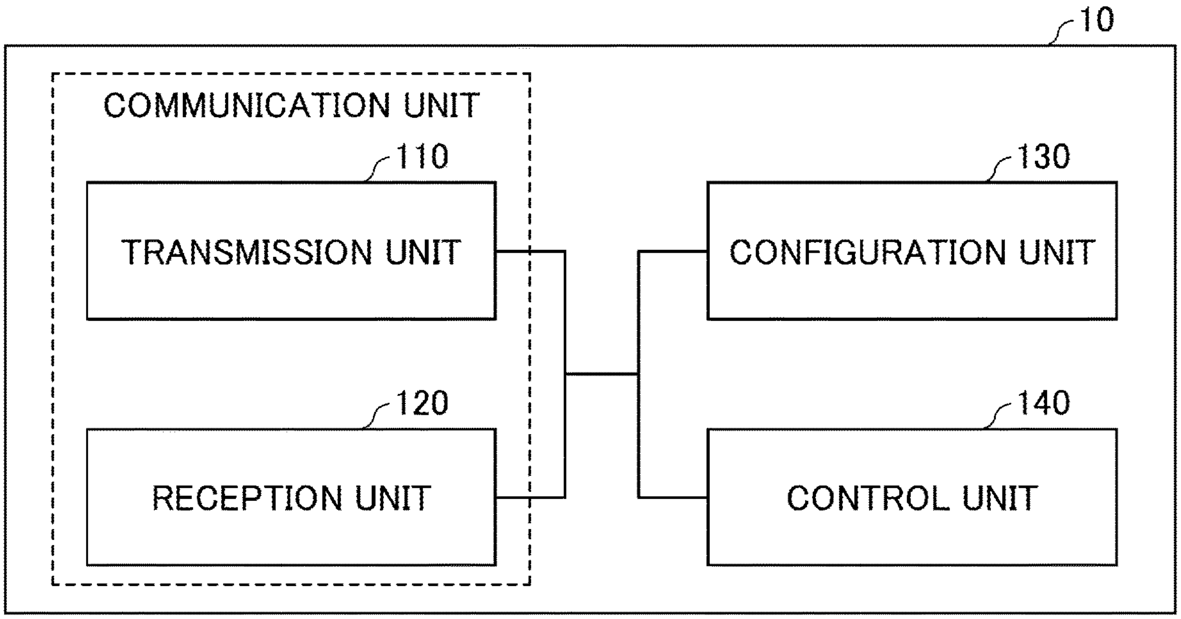
FIG. 15 is a drawing illustrating an example of a functional structure of a base station 10 in an embodiment of the present invention.

FIG. 15 is a diagram illustrating an example of a functional configuration of the base station 10. As shown in FIG. 15, the base station 10 includes a transmission unit 110, a reception unit 120, a configuration unit 130, and a control unit 140. The functional structure illustrated in FIG. 15 is merely an example. Functional divisions and names of functional units may be anything as long as operations according to an embodiment of the present invention can be performed. The transmission unit 110 and the reception unit 120 may be referred to as a communication unit.

The transmission unit 110 includes a function for generating a signal to be transmitted to the terminal 20 side and transmitting the signal wirelessly. The reception unit 120 includes a function for receiving various signals transmitted from the terminal 20 and acquiring, for example, information of a higher layer from the received signals. Further, the transmission unit 110 has a function of transmitting NR-PSS, NR-SSS, NR-PBCH, DL/UL control signals, the DL data, and the like, to the terminal 20. In addition, the transmission unit 110 transmits configuration information, or the like, described in the embodiment.

The configuration unit 130 stores preset configuration information and various configuration information items to be transmitted to the terminal 20 in a storage apparatus and reads the preset configuration information from the storage apparatus if necessary. The control unit 140 performs, for example, resource allocation and control of the entire base station 10. Note the functional unit related to signal transmission in the control unit 140 may be included in the transmission unit 110, and the functional unit related to signal reception in the control unit 140 may be included in the reception unit 120. Further, the transmission unit 110 and the reception unit 120 may be referred to as a transmitter and a receiver, respectively.

<Terminal 20>

Figure 16:
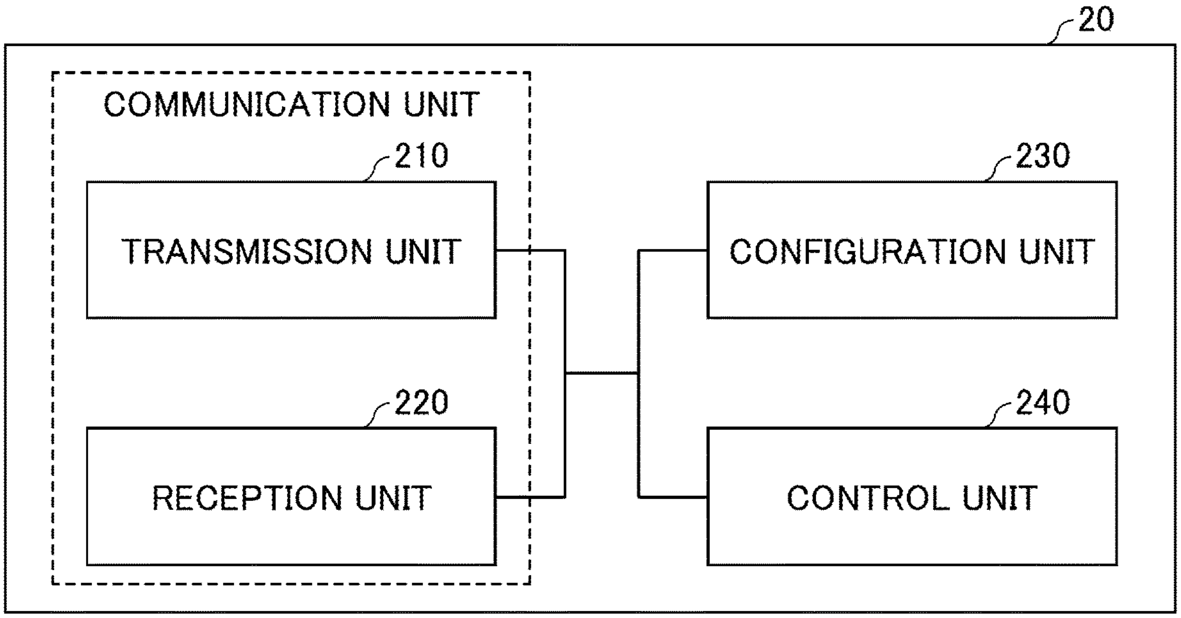
FIG. 16 is a drawing illustrating an example of a functional structure of a terminal 20 in an embodiment of the present invention.

FIG. 16 is a diagram illustrating an example of a functional configuration of the terminal 20. As shown in FIG. 16, the terminal 20 includes a transmission unit 210, a reception unit 220, a configuration unit 230, and a control unit 240. The functional structure illustrated in FIG. 16 is merely an example. Functional divisions and names of functional units may be anything as long as operations according to an embodiment of the present invention can be performed. The transmission unit 210 and the reception unit 220 may be referred to as a communication unit.

The transmission unit 210 generates a transmission signal from transmission data and transmits the transmission signal wirelessly. The reception unit 220 receives various signals wirelessly and obtains upper layer signals from the received physical layer signals. In addition, the transmission unit 210 transmits a HARQ-ACK, and the reception unit 220 receives configuration information described in the embodiment.

The configuration unit 230 stores, in a storage device, various configuration information items received from the base station 20 via the reception unit 220, and reads them from the storage device if necessary. In addition, the configuration unit 230 also stores pre-configured configuration information. The control unit 240 controls the entire terminal 20. Note the functional unit related to signal transmission in the control unit 240 may be included in the transmission unit 210, and the functional unit related to signal reception in the control unit 240 may be included in the reception unit 220. Further, the transmission unit 210 and the reception unit 220 may be referred to as a transmitter and a receiver, respectively.

(Hardware Structure)

In the above functional structure diagrams used for describing an embodiment of the present invention (FIG. 15 and FIG. 16), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming; broadcasting, notifying, communicating, forwarding, configuring, reconfiguring, allocating, mapping, and assigning, etc. For example, a functional block (component) that functions to transmit is called a transmitting unit or a transmitter. In either case, as described above, the implementation method is not particularly limited.

Figure 17:
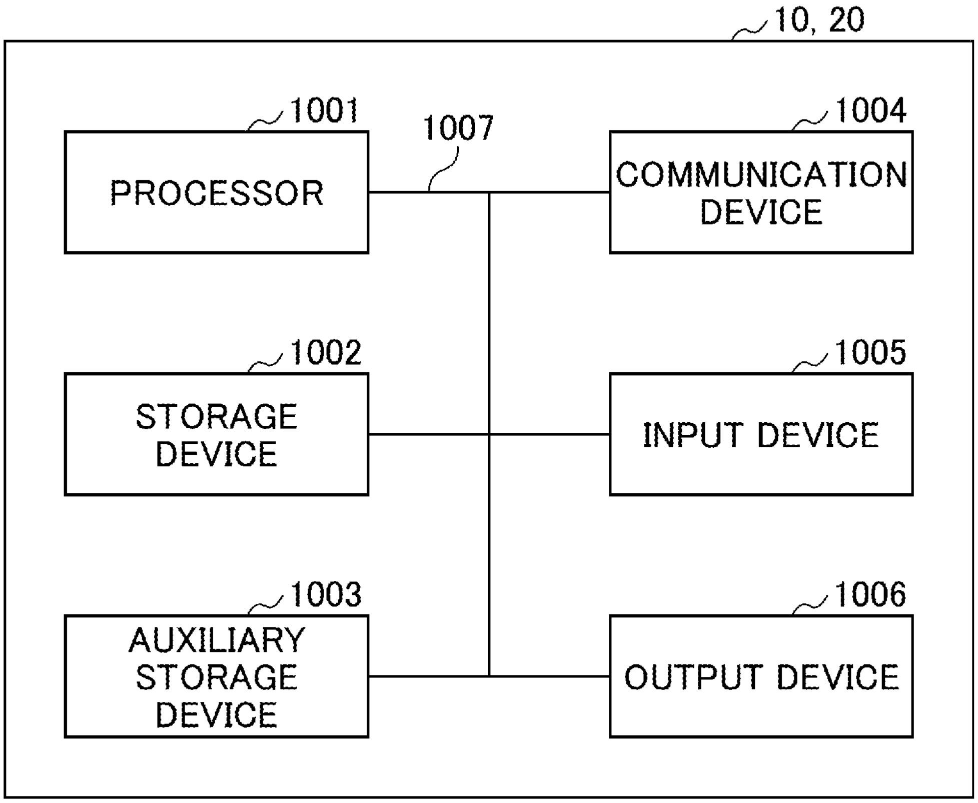
FIG. 17 is a drawing illustrating an example of a hardware structure of the base station 10 or the terminal 20 in an embodiment of the present invention.

For example, the base station 10, terminal 20, etc., according to an embodiment of the present disclosure may function as a computer for processing the radio communication method of the present disclosure. FIG. 17 is a drawing illustrating an example of hardware structures of the base station 10 and terminal 20 according to an embodiment of the present invention. Each of the above-described base station 10 and the terminal 20 may be physically a computer device including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station 10 and terminal 20 may include one or more of each of the devices illustrated in the figure, or may not include some devices.

Each function in the base station 10 and terminal 20 is realized by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads out onto the storage device 1002 a program (program code), a software module, or data from the auxiliary storage device 1003 and/or the communication device 1004, and performs various processes according to the program, the software module, or the data. As the program, a program is used that causes the computer to perform at least a part of operations according to an embodiment of the present invention described above. For example, the control unit 140 of the base station 10 illustrated in FIG. 15 may be realized by control programs that are stored in the storage device 1002 and are executed by the processor 1001. Further, for example, the control unit 240 of the terminal 20 illustrated in FIG. 16 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disc, digital versatile disc, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission or reception device) for communicating with computers via at least one of a wired network and a wireless network, and may be referred to as a network device, a network controller, a network card, a communication module, etc. The communication device 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station 10 and terminal 20 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to an embodiment of the present invention, a terminal is provided. The terminal includes: a reception unit configured to receive a grant related to an uplink shared channel from a base station; a control unit configured to determine whether HARQ-ACK (Hybrid automatic repeat request—Acknowledgement) is to be multiplexed with the uplink shared channel in a case where a DAI (Downlink Assignment Index) included in the grant indicates that the HARQ-ACK is to be multiplexed with the uplink shared channel and where a downlink allocation corresponding to the HARQ-ACK that is to be multiplexed with the uplink shared channel is not received; and a transmission unit configured to transmit the uplink shared channel to the base station.

According to the above configuration, an operation of the terminal 20 can be clarified even in a case where a channel cannot be received in an operation of multiplexing HARQ-ACK or UCI with PUSCH. That is, in a case where an uplink grant indicates multiplexing of a response related to retransmission control, an uplink channel to be transmitted can be determined.

The control unit may multiplex the HARQ-ACK with the uplink shared channel in a case where there is only the uplink shared channel in a slot in which the uplink shared channel is transmitted. According to the above configuration, an operation of the terminal 20 can be clarified even in a case where a channel cannot be received in an operation of multiplexing HARQ-ACK or UCI with PUSCH.

The control unit may multiplex the HARQ-ACK with one uplink shared channel in a case where there are a plurality of uplink shared channels in a slot in which the uplink shared channel is transmitted and where only a grant corresponding to the one uplink shared channel among the plurality of uplink shared channels indicates that the HARQ-ACK is to be multiplexed with the one uplink shared channel. According to the above configuration, an operation of the terminal 20 can be clarified even in a case where a channel cannot be received in an operation of multiplexing HARQ-ACK or UCI with PUSCH.

The control unit may multiplex the HARQ-ACK with all of or one of two or more of uplink shared channels in a case where there are a plurality of uplink shared channels in a slot in which the uplink shared channel is transmitted and where a grant corresponding to the one or more of the plurality of uplink shared channels indicates that the HARQ-ACK is to be multiplexed with the two or more of the uplink shared channels. According to the above configuration, an operation of the terminal 20 can be clarified even in a case where a channel cannot be received in an operation of multiplexing HARQ-ACK or UCI with PUSCH.

The control unit may determine an operation related to multiplexing of the HARQ-ACK with the uplink shared channel, based on a number of HARQ-ACK bits. According to the above configuration, in an operation of multiplexing HARQ-ACK or UCI with PUSCH, an operation of PUSCH multiplexing can be changed depending on the number of HARQ-ACK bits.

In addition, according to an embodiment of the present invention, a communication method performed by a terminal is provided. The communication method includes: receiving a grant related to an uplink shared channel from a base station; determining whether HARQ-ACK (Hybrid automatic repeat request—Acknowledgement) is to be multiplexed with the uplink shared channel in a case where a DAI (Downlink Assignment Index) included in the grant indicates that the HARQ-ACK is to be multiplexed with the uplink shared channel and where a downlink allocation corresponding to the HARQ-ACK that is to be multiplexed with the uplink shared channel is not received; and transmitting the uplink shared channel to the base station.

According to the above configuration, an operation of the terminal 20 can be clarified even in a case where a channel cannot be received in an operation of multiplexing HARQ-ACK or UCI with PUSCH. That is, in a case where an uplink grant indicates multiplexing of a response related to retransmission control, an uplink channel to be transmitted can be determined.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, the base station 10 and the terminal 20 have been described by using functional block diagrams. However, the apparatuses may be realized by hardware, software, or a combination of hardware and software. The software executed by a processor included in the base station 10 according to an embodiment of the present invention and the software executed by a processor included in the terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station 10 in the present specification, may be performed by an upper node in some cases. In a network including one or more network nodes including the base station 10, it is apparent that various operations performed for communicating with the terminal 20 may be performed by the base station 10 and/or another network node other than the base station 10 (for example, but not limited to, MME or S-GW). According to the above, a case is described in which there is a single network node other than the base station 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms “system” and “network” are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms “BS: Base Station”, “Radio Base Station”, “Base Station”, “Fixed Station”, “NodeB”, “eNodeB (eNB)”, “gNodeB (gNB)”, “Access Point”, “Transmission Point”, “Reception Point”, “Transmission/Reception Point”, “Cell”, “Sector”, “Cell Group”, “Carrier”, “Component Carrier”, and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term “cell” or “sector” refers to a part or all of the coverage area of at least one of the base station and base station subsystem that provides communication services at the coverage.

In the present disclosure, terms such as “mobile station (MS)”, “user terminal”, “user equipment (UE)”, “terminal”, and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple terminals 20 (e.g., may be referred to as D2D (Device-to-Device), V2X (Vehicle-to-Everything), etc.). In this case, the function of the base station 10 described above may be provided by the terminal 20. Further, the phrases “up” and “down” may also be replaced by the phrases corresponding to terminal-to-terminal communication (e.g., “side”). For example, an uplink channel, a downlink channel, or the like, may be read as a sidelink channel.

Further, the user terminal in the present disclosure may be read as the base station. In this case, the function of the user terminal described above may be provided by the base station.

The term “determining” used in the present specification may include various actions or operations. The “determining” may include, for example, a case in which “judging”, “calculating”, “computing”, “processing”, “deriving”, “investigating”, “looking up, search, inquiry” (e.g., looking up a table, database, or other data structures), or “ascertaining” is deemed as “determining”. Further, the “determining” may include a case in which “receiving” (e.g., receiving information), “transmitting” (e.g., transmitting information), “inputting”, “outputting”, or “accessing” (e.g., accessing data in a memory) is deemed as “determining”. Further, the “determining” may include a case in which “resolving”, “selecting”, “choosing”, “establishing”, “comparing”, or the like is deemed as “determining”. In other words, the “determining” may include a case in which a certain action or operation is deemed as “determining”. Further, “decision” may be read as “assuming”, “expecting”, or “considering”, etc.

The term “connected” or “coupled” or any variation thereof means any direct or indirect connection or connection between two or more elements and may include the presence of one or more intermediate elements between the two elements “connected” or “coupled” with each other. The coupling or connection between the elements may be physical, logical, or a combination thereof. For example, “connection” may be read as “access”. As used in the present disclosure, the two elements may be thought of as being “connected” or “coupled” to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "based on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts", "circuits", "devices", etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission or reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain, such as OFDM (Orthogonal Frequency Division Multiplexing) symbols, SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each terminal 20 to allocate radio resources (such as frequency bandwidth, transmission power, etc. that can be used in each terminal 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.,) may be replaced with a TTI having a time length exceeding 1 ms, and the short TTI (e.g., shortened TTI, etc.,) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in an RB may be the same, regardless of the numerology, and may be 12, for example. The number of subcarriers included in an RB may be determined on the basis of numerology.

Further, the time domain of an RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), subcarrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a terminal 20, one or more BWPs may be configured in one carrier.

At least one of the configured BWPs may be activated, and the terminal 20 may assume that the terminal 20 will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in an RB, the number of symbols in a TTI, the symbol length, the cyclic prefix (CP) length, and the like, may be changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

Each aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

DESCRIPTION OF THE REFERENCE NUMERALS

10 Base station
110 Transmission unit
120 Reception unit
130 Configuration unit
140 Control unit
20 Terminal
210 Transmission unit
220 Reception unit
230 Configuration unit
240 Control unit
1001 Processor
1002 Storage device
1003 Auxiliary storage device
1004 Communication device
1005 Input device
1006 Output device

The invention claimed is:

1. A terminal comprising:

a receiver configured to receive, from a base station, DCI (Downlink Control Information) including a DAI (Downlink Assignment Index) field for scheduling a first uplink shared channel in a certain slot;

a processor configured to determine the first uplink shared channel as a candidate for multiplexing a HARQ-ACK (Hybrid automatic repeat request-Acknowledgement) in a case where there are a plurality of uplink shared channels in the certain slot, where the DAI indicates that the HARQ-ACK is to be multiplexed with the first uplink shared channel, and where there is no uplink control channel corresponding to the HARQ-ACK in the certain slot; and a transmitter configured to transmit the first uplink shared channel to the base station, wherein the processor:

determines the first uplink shared channel as a candidate for multiplexing the HARQ-ACK in a case where there are a plurality of uplink shared channels in the certain slot, where the DAI is not four (4) when a type-2 HARQ-ACK codebook is used or the DAI is not zero (0) when a type-1 HARQ-ACK codebook is used, and where there is no uplink control channel corresponding to the HARQ-ACK in the certain slot, and determines whether or not to multiplex the HARQ-ACK with the first uplink shared channel, based on a rule for determining a UCI (Uplink Control Information) multiplexing destination, and determines a candidate for multiplexing the HARQ-ACK where an uplink shared channel including CSI (Channel State Information) is prioritized over other uplink shared channels, where a DG (Dynamic Grant)-uplink shared channel is prioritized over a CG (Configured Grant)-uplink shared channel, and where an uplink shared channel with a smaller serving cell index is prioritized.

2. A base station comprising:

a transmitter configured to transmit, to a terminal, DCI (Downlink Control Information) including a DAI (Downlink Assignment Index) field for scheduling a first uplink shared channel in a certain slot;

a processor configured to determine the first uplink shared channel as a candidate for multiplexing a HARQ-ACK (Hybrid automatic repeat request-Acknowledgement) in a case where there are a plurality of uplink shared channels in the certain slot, where the DAI indicates that the HARQ-ACK is to be multiplexed with the first uplink shared channel, and where there is no uplink control channel corresponding to the HARQ-ACK in the certain slot; and a receiver configured to receive the first uplink shared channel from the terminal, wherein the processor:

determines the first uplink shared channel as a candidate for multiplexing the HARQ-ACK in a case where there are a plurality of uplink shared channels in the certain slot, where the DAI is not four (4) when a type-2 HARQ-ACK codebook is used or the DAI is not zero (0) when a type-1 HARQ-ACK codebook is used, and where there is no uplink control channel corresponding to the HARQ-ACK in the certain slot, and determines whether or not to multiplex the HARQ-ACK with the first uplink shared channel, based on a rule for determining a UCI (Uplink Control Information) multiplexing destination, and determines a candidate for multiplexing the HARQ-ACK where an uplink shared channel including CSI (Channel State Information) is prioritized over other uplink shared channels, where a DG (Dynamic Grant)-uplink shared channel is prioritized over a CG (Configured Grant)-uplink shared channel, and where an uplink shared channel with a smaller serving cell index is prioritized.

3. A communication system comprising: a terminal; and a base station, wherein the terminal includes:

a first receiver configured to receive, from the base station, DCI (Downlink Control Information) including a DAI (Downlink Assignment Index) field for scheduling a first uplink shared channel in a certain slot;

a first processor configured to determine the first uplink shared channel as a candidate for multiplexing a HARQ-ACK (Hybrid automatic repeat request-Acknowledgement) in a case where there are a plurality of uplink shared channels in the certain slot, where the DAI indicates that the HARQ-ACK is to be multiplexed with the first uplink shared channel, and where there is no uplink control channel corresponding to the HARQ-ACK in the certain slot; and a first transmitter configured to transmit the first uplink shared channel to the base station, wherein the first processor:

determines the first uplink shared channel as a candidate for multiplexing the HARQ-ACK in a case where there are a plurality of uplink shared channels in the certain slot, where the DAI is not four (4) when a type-2 HARQ-ACK codebook is used or the DAI is not zero (0) when a type-1 HARQ-ACK codebook is used, and where there is no uplink control channel corresponding to the HARQ-ACK in the certain slot, and determines whether or not to multiplex the HARQ-ACK with the first uplink shared channel, based on a rule for determining a UCI (Uplink Control Information) multiplexing destination, and determines a candidate for multiplexing the HARQ-ACK where an uplink shared channel including CSI (Channel State Information) is prioritized over other uplink shared channels, where a DG (Dynamic Grant)-uplink shared channel is prioritized over a CG (Configured Grant)-uplink shared channel, and where an uplink shared channel with a smaller serving cell index is prioritized, and the base station includes:

a second transmitter configured to transmit, to the terminal, DCI including the DAI field for scheduling the first uplink shared channel in the certain slot;

a second processor configured to determine the first uplink shared channel as a candidate for multiplexing a HARQ-ACK (Hybrid automatic repeat request-Acknowledgement) in a case where there are a plurality of uplink shared channels in the certain slot, where the DAI indicates that the HARQ-ACK is to be multiplexed with the first uplink shared channel, and where there is no uplink control channel corresponding to the HARQ-ACK in the certain slot; and a second receiver configured to receive the first uplink shared channel from the terminal.

4. A communication method performed by a terminal, the communication method comprising:

receiving, from a base station, DCI (Downlink Control Information) including a DAI (Downlink Assignment Index) field for scheduling a first uplink shared channel in a certain slot;

determining the first uplink shared channel as a candidate for multiplexing a HARQ-ACK (Hybrid automatic repeat request-Acknowledgement) in a case where there are a plurality of uplink shared channels in the certain slot, where the DAI indicates that the HARQ-ACK is to be multiplexed with the first uplink shared channel, and where there is no uplink control channel corresponding to the HARQ-ACK in the certain slot;

transmitting the first uplink shared channel to the base station;

determining the first uplink shared channel as a candidate for multiplexing the HARQ-ACK in a case where there are a plurality of uplink shared channels in the certain slot, where the DAI is not four (4) when a type-2 HARQ-ACK codebook is used or the DAI is not zero (0) when a type-1 HARQ-ACK codebook is used, and where there is no uplink control channel corresponding to the HARQ-ACK in the certain slot;

determining whether or not to multiplex the HARQ-ACK with the first uplink shared channel, based on a rule for determining a UCI (Uplink Control Information) multiplexing destination; and determining a candidate for multiplexing the HARQ-ACK where an uplink shared channel including CSI (Channel State Information) is prioritized over other uplink shared channels, where a DG (Dynamic Grant)-uplink shared channel is prioritized over a CG (Configured Grant)-uplink shared channel, and where an uplink shared channel with a smaller serving cell index is prioritized.

* * * * *